US012280579B2

United States Patent
Kunieda et al.

(10) Patent No.: US 12,280,579 B2
(45) Date of Patent: Apr. 22, 2025

(54) SHEET PROCESSING APPARATUS AND IMAGE FORMING SYSTEM

(71) Applicants: Akira Kunieda, Tokyo (JP); Satoshi Kuno, Tokyo (JP); Hirofumi Horita, Kanagawa (JP); Koju Kawakami, Tokyo (JP); Yasunobu Kidoura, Kanagawa (JP); Ryohsuke Akaishi, Kanagawa (JP); Yohsuke Haraguchi, Kanagawa (JP)

(72) Inventors: Akira Kunieda, Tokyo (JP); Satoshi Kuno, Tokyo (JP); Hirofumi Horita, Kanagawa (JP); Koju Kawakami, Tokyo (JP); Yasunobu Kidoura, Kanagawa (JP); Ryohsuke Akaishi, Kanagawa (JP); Yohsuke Haraguchi, Kanagawa (JP)

(73) Assignee: Ricoh Company, LTD., Tokyo (JP)

( * ) Notice: Subject to any disclaimer, the term of this patent is extended or adjusted under 35 U.S.C. 154(b) by 121 days.

(21) Appl. No.: 18/168,689

(22) Filed: Feb. 14, 2023

(65) Prior Publication Data

US 2023/0256726 A1    Aug. 17, 2023

(30) Foreign Application Priority Data

Feb. 16, 2022   (JP) ................................ 2022-021849
Dec. 13, 2022   (JP) ................................ 2022-198480

(51) Int. Cl.
B32B 41/00    (2006.01)
B32B 37/00    (2006.01)
(Continued)

(52) U.S. Cl.
CPC .......... B32B 38/18 (2013.01); B32B 37/0046 (2013.01); B32B 41/00 (2013.01);
(Continued)

(58) Field of Classification Search
CPC ..... B32B 38/18; B32B 37/0046; B32B 41/00; B32B 2041/04; B32B 37/142;
(Continued)

(56) References Cited

U.S. PATENT DOCUMENTS 10,189,662 B2 * 1/2019 Okano .................... B65H 7/125
2004/0188916 A1 * 9/2004 Tsukamoto .............. B65H 7/06
271/110

(Continued)

FOREIGN PATENT DOCUMENTS

JP    2010-089866    4/2010
JP    2021-143072    9/2021

*Primary Examiner* — Michael N Orlando
*Assistant Examiner* — Joshel Rivera
(74) *Attorney, Agent, or Firm* — Harness, Dickey & Pierce, P.L.C.

(57) ABSTRACT

A sheet processing apparatus including a sheet feeder, a sheet processing device, a sheet ejection device, a purge unit, a multifeed sensor, a sheet sensor, and circuitry. The circuitry stops an operation of the sheet processing apparatus when the multifeed sensor has not detected multifeed of the sheet and the sheet sensor does not detect a trailing end of the sheet after a first set time from detection of a leading end of the sheet, stop the operation when the multifeed sensor has detected the multifeed and the sheet sensor does not detect the trailing end of the sheet after a second set time from the detection, and conveys the sheet toward the purge unit without stopping the operation when the multifeed sensor has detected the multifeed and the sheet sensor detects the trailing end of the sheet before the second set time elapses from the detection.

11 Claims, 17 Drawing Sheets

(51) Int. Cl.
 *B32B 38/18* (2006.01)
 *B65H 7/12* (2006.01)
(52) U.S. Cl.
 CPC ............ *B65H 7/12* (2013.01); *B32B 2041/04* (2013.01); *B65H 2701/1313* (2013.01)
(58) Field of Classification Search
 CPC .............. B32B 2037/0061; B65H 7/12; B65H 2701/1313; B65H 29/62; B65H 2513/512; B65H 2801/27; B65H 7/06
 USPC .................... 156/60, 64, 350, 351, 378, 379
 See application file for complete search history.

(56) References Cited

U.S. PATENT DOCUMENTS

2020/0089151 A1\* 3/2020 Yoshino ............. G03G 15/5041
2022/0291620 A1  9/2022 Fujita et al.

\* cited by examiner

| SHEET SIZE | SHEET THICKNESS | SECOND PREDETERMINE AMOUNT NB(mm) |
|---|---|---|
| A4 | THIN | 350 |
| A4 | THICK | 400 |
| A3 | THIN | 500 |
| A3 | THICK | 600 |

SHEET PROCESSING APPARATUS AND IMAGE FORMING SYSTEM

CROSS-REFERENCE TO RELATED APPLICATIONS

This patent application is based on and claims priority pursuant to 35 U.S.C. § 119(a) to Japanese Patent Application Nos. 2022-021849, filed on Feb. 16, 2022, and 2022-198480, filed on Dec. 13, 2022, in the Japan Patent Office, the entire disclosure of each of which is hereby incorporated by reference herein.

BACKGROUND

Technical Field

Embodiments of the present disclosure relate to a sheet processing apparatus such as a sheet separator or a sheet laminator, and an image forming system including the sheet processing apparatus and an image forming apparatus such as a copier, a printer, a facsimile machine, or a multifunction peripheral having at least two of copying, printing, and facsimile functions.

Background Art

Various types of sheet processing apparatuses in the art such as sheet separation devices separate two sheets of a two-ply sheet and insert an inner sheet between the two sheets of the two-ply sheet. Some sheet processing apparatuses in the art are known to have technologies to eject a sheet such as a two-ply sheet to a purge unit such as a purge tray when the sheet has abnormal condition such as separation failure.

More specifically, a sheet separation device (sheet processing apparatus) in the art includes an ejection tray, so that a two-ply sheet in which an inner sheet is inserted is ejected to the ejection tray after the sheet separating operation and the sheet inserting operation have been successfully performed on the two-ply sheet. On the other hand, to easily remove the two-ply sheet on which the sheet separating operation has not been performed successfully, the two-ply sheet with separation failure is not ejected to the ejection tray but is ejected to a purge tray (purge unit) via the non-laminated sheet conveyance passage.

SUMMARY

Embodiments of the present disclosure described herein provide a novel sheet processing apparatus including a sheet feeder, a sheet processing device, a sheet ejection device, a purge unit, a multifeed sensor, a sheet sensor, and circuitry. The sheet feeder feeds a sheet toward a sheet conveyance passage. The sheet processing device is disposed downstream from the sheet feeder in a sheet conveyance direction in which the sheet is conveyed. The sheet processing device performs a predetermined operation on the sheet conveyed in the sheet conveyance passage. The sheet ejection device is disposed downstream from the sheet processing device in the sheet conveyance direction. The sheet ejection device stacks the sheet when the predetermined operation has been performed on the sheet by the sheet processing device. The purge unit is disposed downstream from the sheet processing device in the sheet conveyance direction. The purge unit stacks the sheet when the predetermined operation has not been performed on the sheet by the sheet processing device. The multifeed sensor is disposed on the sheet conveyance passage. The misfeed sensor detects whether the sheet and another sheet are multifed from the sheet feeder. The sheet sensor is disposed downstream from the multifeed sensor on the sheet conveyance passage in the sheet conveyance direction. The sheet sensor detects the sheet passing a position of the sheet sensor. The circuitry is to: stop an operation of the sheet processing apparatus when the multifeed sensor has not detected multifeed of the sheet and the sheet sensor does not detect a trailing end of the sheet after a first set time set in advance in accordance with a size of the sheet in the sheet conveyance direction has elapsed from detection of a leading end of the sheet with the sheet sensor; stop an operation of the sheet processing apparatus when the multifeed sensor has detected the multifeed of the sheet and the sheet sensor does not detect the trailing end of the sheet after a second set time longer than the first set time has elapsed from the detection of the leading end of the sheet with the sheet sensor; and cause the sheet processing apparatus to convey the sheet toward the purge unit without stopping the operation of the sheet processing apparatus when the multifeed sensor has detected the multifeed of the sheet and the sheet sensor detects the trailing end of the sheet before the second set time elapses from the detection of the leading end of the sheet with the sheet sensor.

Further, embodiments of the present disclosure described herein provide an image forming system including the above-described sheet processing apparatus and an image forming apparatus to form an image on a sheet.

BRIEF DESCRIPTION OF THE SEVERAL VIEWS OF THE DRAWINGS

Exemplary embodiments of this disclosure will be described in detail based on the following figures, wherein:

FIG. 12 including

Figure 1:
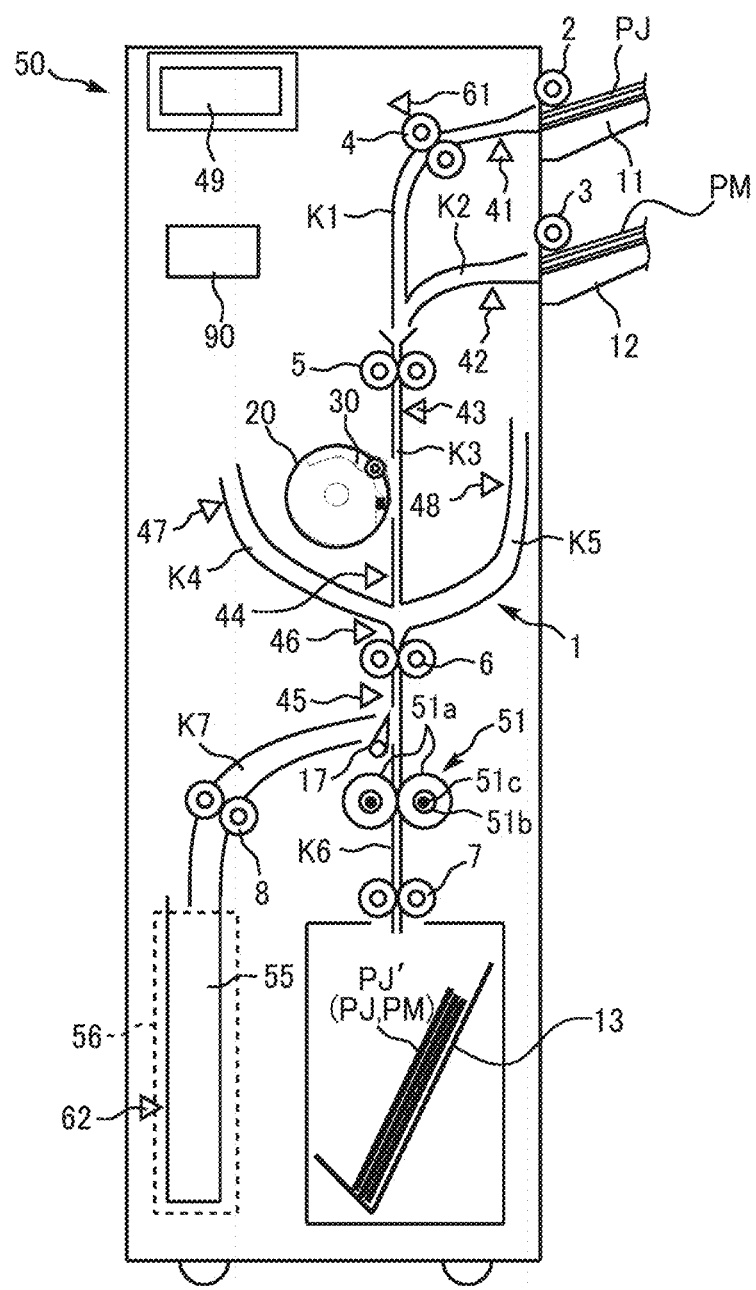
FIG. 1 is a schematic diagram illustrating an overall configuration of a sheet laminator according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

It will be understood that if an element or layer is referred to as being "on," "against," "connected to" or "coupled to" another element or layer, then it can be directly on, against, connected or coupled to the other element or layer, or intervening elements or layers may be present. In contrast, if an element is referred to as being "directly on," "directly connected to" or "directly coupled to" another element or layer, then there are no intervening elements or layers present. As used herein, the term "connected/coupled" includes both direct connections and connections in which there are one or more intermediate connecting elements. Like numbers refer to like elements throughout. As used herein, the term "and/or" includes any and all combinations of one or more of the associated listed items.

Spatially relative terms, such as "beneath," "below," "lower," "above," "upper" and the like may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors herein interpreted accordingly.

The terminology used herein is for describing particular embodiments and examples and is not intended to be limiting of exemplary embodiments of this disclosure. As used herein, the singular forms "a," "an," and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

Referring now to the drawings, embodiments of the present disclosure are described below. In the drawings for explaining the following embodiments, the same reference codes are allocated to elements (members or components) having the same function or shape and redundant descriptions thereof are omitted below.

Hereinafter, embodiments of the present disclosure are described with reference to the drawings. In the drawings, the same or corresponding parts are denoted by the same reference numerals, and redundant description thereof are simplified or omitted as appropriate.

Hereinafter, embodiments of the present disclosure are described with reference to the drawings. In the drawings, the same or corresponding parts are denoted by the same reference numerals, and redundant description thereof are simplified or omitted as appropriate.

First, a description is given of the overall configuration and operations of a sheet laminator 50 as a sheet processing apparatus, with reference to FIG. 1.

FIG. 1 is a schematic diagram illustrating an overall configuration of a sheet laminator according to an embodiment of the present disclosure.

The sheet laminator 50 serving as a sheet processing apparatus includes: a sheet separation device 1 and a sheet lamination device 51 each serving as a sheet processing device; a first sheet tray 11 and a second sheet tray 12 each serving as a sheet feeder; an ejection tray 13 serving as an ejection unit or a first ejection tray; and a purge tray 55 serving as a purge unit or a second ejection tray. The sheet laminator 50 according to the present embodiment conveys a sheet (e.g., a two-ply sheet PJ and an inner sheet PM) downwardly.

The sheet laminator 50 includes an operation display panel 49 that functions as an operation display on the exterior of the sheet laminator 50 to display various kinds of information about the sheet laminator 50 and input various kinds of commands by a user.

The sheet lamination device 51 serving as a sheet processing device performs a sheet laminating operation on a two-ply sheet PJ by application of heat and pressure while conveying the two-ply sheet PJ in a predetermined sheet conveyance direction. The two-ply sheet PJ includes two sheets, which are a first sheet P1 and a second sheet P2, overlapped and bonded together at one end of the two-ply sheet PJ as a bonding portion A of the two-ply sheet PJ. An inner sheet PM is inserted between the first sheet P1 and the second sheet P2 of the two-ply sheet PJ.

The sheet separation device 1 serving as a sheet processing device includes a first sheet tray 11, a second sheet tray 12, a first feed roller 2, a second feed roller 3, a multifeed detection sensor 61 serving as a multifeed detector or sensor, a first conveyance roller pair 4, a second conveyance roller pair 5, a third conveyance roller pair 6, a first sensor 41, a second sensor 42, a third sensor 43, a fourth sensor 44, a fifth sensor 45, a sixth sensor 46, a seventh sensor 47, an eighth sensor 48, a winding roller 20, a moving mechanism 30, and separation members 16 (see FIGS. 7A to 7C and FIGS. 11A to 11E). Each of the separation members 16 functions as a separator or a separation plate.

As illustrated in FIG. 1, the sheet laminator 50 includes the sheet separation device 1, the first sheet tray 11, the second sheet tray 12, the first feed roller 2, the second feed roller 3, the multifeed detection sensor 61 serving as a multifeed detector or sensor, the first conveyance roller pair 4, the second conveyance roller pair 5, the third conveyance roller pair 6, the ejection tray 13, the first sensor 41, the second sensor 42, the third sensor 43, the fourth sensor 44, the fifth sensor 45, the sixth sensor 46, the seventh sensor 47, the eighth sensor 48, a purge sensor 62 serving as a purge detector or sensor, a first guide 25 serving as an inner restraint, and a second guide 26 serving as an outer restraint. The sheet separation device 1 further includes the winding roller 20, the moving mechanism 30, the switching claw 17, and the separation members 16 (see FIGS. 7A to 7C and FIGS. 11A to 11E). The sheet laminator 50 further includes a plurality of sheet conveyance passages as described below, such as a first sheet conveyance passage K1 (curved conveyance passage), a second sheet conveyance passage K2, a third sheet conveyance passage K3, a first branched sheet conveyance passage K4, and a second branched sheet conveyance passage K5.

The sheet separation device 1 is a sheet processing device that performs a sheet separating operation and a sheet inserting operation. To be more specific, the sheet separation device 1 serving as a sheet processing device performs the sheet separating operation to separate the non-bonding portion of a two-ply sheet PJ in which two sheets, which are a first sheet P1 and a second sheet P2, are overlapped and bonded together at one end of the two-ply sheet PJ as a bonding portion A of the two-ply sheet PJ (see FIGS. 11A to 11E and other drawings). The sheet separation device 1 then performs the sheet inserting operation to insert an inner sheet PM between the first sheet P1 and the second sheet P2 separated from each other by the sheet separating operation.

In particular, in the present embodiment, the two-ply sheet PJ is made of the first sheet P1 and the second sheet P2 overlapped and bonded together at one side of the four sides as the bonding portion A. In other words, in the two-ply sheet PJ including the first sheet P1 and the second sheet P2, one side (the bonding portion A) of the first sheet P1 and one side (the bonding portion A) of the second sheet P2 are bonded (attached) by, e.g., thermal welding or gluing, and the other side of the first sheet P1 and the other side of the second sheet P2 are not bonded (attached). As the first sheet P1 and the second sheet P2 of the two-ply sheet PJ, a transparent film sheet (that is, a lamination sheet) may be employed.

The sheet separation device 1 separates the first sheet P1 and the second sheet P2 of the two-ply sheet PJ, in other words, separates the other sides of the two sheets to the bonding portion A while maintaining bonding of the first sheet P1 and the second sheet P2 of the two-ply sheet PJ. Subsequently, the sheet separation device 1 inserts an inner sheet PM between the separated two sheets, which are the first sheet P1 and the second sheet P2 of the two-ply sheet PJ. The inner sheet PM is a sheet including at least one plain paper or a photograph.

The sheet lamination device 51 is a sheet processing device that performs the sheet laminating operation on the two-ply sheet PJ after the sheet separation device 1 has performed the sheet separating operation and the sheet inserting operation on the two-ply sheet PJ.

Specifically, the sheet lamination device 51 performs the sheet laminating operation on the two-ply sheet PJ after the inner sheet PM is inserted between the two sheets, which are the first sheet P1 and the second sheet P2 of the two-ply sheet PJ, while the two sheets are separated from each other by the sheet separation device 1. In other words, the sheet lamination device 51 applies heat and pressure on the non-bonding portion of the two sheets (i.e., the first sheet P1 and the second sheet P2) of the two-ply sheet PJ to bond the two sheets together when the inner sheet PM is inserted between the two sheets P1 and P2 of the two-ply sheet PJ. The sheet lamination device 51 is disposed downstream from the sheet separation device 1 in the sheet conveyance direction. In other words, the sheet lamination device 51 is disposed on the downstream side in the forward direction and the left side in FIG. 1. The sheet lamination device 51 includes a thermal pressure roller pair to apply heat and pressure to the two-ply sheet PJ while conveying the two-ply sheet PJ in the forward direction with the inner sheet PM being inserted in the two-ply sheet PJ. Further, a fourth sheet conveyance passage K6 that functions as a sheet conveyance passage is provided between and defined by the third conveyance roller pair 6 and the sheet lamination device 51. The sheet lamination device 51 further includes the thermal pressure roller pair 51a, a rotary shaft 51b of the thermal pressure roller pair 51a, and a heater 51c serving as a heater inside the rotary shaft 51b to heat the thermal pressure roller pair 51a.

The sheet lamination device 51 according to the present embodiment includes a single thermal pressure roller pair, but the sheet lamination device 51 may include two or more thermal pressure roller pairs.

The ejection tray 13 stacks the two-ply sheet PJ' ejected from the sheet laminator 50. The two-ply sheet PJ' is the two-ply sheet PJ and the inner sheet PM after the sheet laminator 50 has performed the sheet laminating operation on the two-ply sheet PJ. In other words, the ejection tray 13 functions as an ejection unit to which the sheet is ejected after the sheet processing device (e.g., the sheet separation device 1 and the sheet lamination device 51) has performed the predetermined process (e.g., the sheet separating operation, the sheet inserting operation, and the sheet laminating operation) on the sheet.

The purge tray 55 functions as a purge unit stacks the sheet ejected when the sheet processing device (e.g., the sheet separation device 1 or the sheet lamination device 51) has not performed the predetermined process (e.g., the sheet separating operation, the sheet inserting operation, and the sheet laminating operation) on the sheet.

The sheet laminator 50 further includes the plurality of sheet conveyance passages such as the first sheet conveyance passage K1, the second sheet conveyance passage K2, the third sheet conveyance passage K3, the first branched sheet conveyance passage K4, the second branched sheet conveyance passage K5, the fourth sheet conveyance passage K6, and a non-laminated sheet conveyance passage K7. Each of the first sheet conveyance passage K1, the second sheet conveyance passage K2, the third sheet conveyance passage K3, the first branched sheet conveyance passage K4, the second branched sheet conveyance passage K5, the fourth sheet conveyance passage K6, and the retract sheet conveyance passage K7 includes two conveyance guides (guide plates) facing each other to guide and convey the sheet such as the two-ply sheet PJ and the inner sheet PM.

In particular, in the present embodiment, the first branched sheet conveyance passage K4 and the second branched sheet conveyance passage K5 branch off in different directions from the third sheet conveyance passage K3 between the winding roller 20 and the third sheet conveyance passage K3, with the third sheet conveyance passage K3 interposed between the first branched sheet conveyance passage K4 and the second branched sheet conveyance passage K5.

Further, the fourth sheet conveyance passage K6 is a sheet conveyance passage extending from the sheet separation device 1 (the third conveyance roller pair 6) to the sheet lamination device 51. Further, the non-laminated sheet conveyance passage K7 is a sheet conveyance passage extending from the sheet separation device 1 to the purge tray 55 serving as a purge unit. The non-laminated sheet conveyance passage K7 is different from the sheet conveyance passage to the sheet lamination device 51. Specifically, the fourth sheet conveyance passage K6 and the non-laminated sheet conveyance passage K7 branch off in different directions from the downstream side (i.e., the lower side in FIG. 1) of the third conveyance roller pair 6.

As illustrated in FIG. 1, the two-ply sheet PJ is stacked on the first sheet tray 11. The first feed roller 2 feeds the uppermost two-ply sheet PJ that is placed on top of the two-ply sheets PJ on the first sheet tray 11, to the first conveyance roller pair 4, and the first conveyance roller pair 4 conveys the (uppermost) two-ply sheet PJ along the first sheet conveyance passage K1.

As described above, each of the first sheet tray 11 and the first feed roller 2 functions as a sheet feeder to feed the two-ply sheet PJ toward the sheet conveyance passage. The sheet feeder is controlled by the controller 90 (see FIG. 1). To be more specific, the controller 90 drives and rotates the first feed roller 2 to feed the two-ply sheet PJ from the first sheet tray 11.

The sheet laminator 50 according to the present embodiment includes a multifeed detection sensor 61 (serving as a multifeed detector or sensor) in proximity to the first feed roller 2, in other words, at the position of the first conveyance roller pair 4. The multifeed detection sensor 61 can detect multiple feed of the two-ply sheets PJ, in other words, the state in which a plurality of two-ply sheets PJ are conveyed in layers at one time. Details of the multifeed detection sensor 61 are described below.

Further, the inner sheet PM is stacked on the second sheet tray 12. Then, the second feed roller 3 feeds the uppermost inner sheet PM placed on top of the inner sheets PM on the second sheet tray 12.

As described above, each of the second sheet tray 12 and the second feed roller 3 functions as a sheet feeder to feed the inner sheet PM that is a sheet to be inserted between the two sheets, which are the first sheet P1 and the second sheet P2, of the two-ply sheet PJ with the non-bonding portion being separated. Then, this sheet feeder is controlled by the controller 90. To be more specific, the controller 90 drives and rotates the second feed roller 3 to feed the inner sheet PM from the second sheet tray 12.

Then, the controller 90 of the sheet laminator 50 according to the present embodiment causes the second feed roller 3 to start feeding the inner sheet PM from the second sheet tray 12 after the first feed roller 2 has fed the two-ply sheet PJ from the first sheet tray 11 and before the operation to separate the non-bonding portion of the two-ply sheet PJ is completed.

In other words, in the present embodiment, the feeding of the two-ply sheet PJ and the feeding of the inner sheet PM are not performed separately (instructed by a user via the operation display panel 49) but can be performed in a single operation. To be more specific, as a user presses the button on the operation display panel 49 once to start the process, the sheet separating operation in which the two-ply sheet PJ is fed and separated, the sheet inserting operation in which the inner sheet PM is inserted into the two-ply sheet PJ between the first sheet P1 and the second sheet P2 separated from each other, and the sheet laminating operation are collectively performed automatically based on the single instruction (request).

The operation to start feeding the inner sheet PM from the second sheet tray 12 is performed not after completion of the sheet separating operation of the two-ply sheet PJ but performed before completion of the sheet separating operation of the two-ply sheet PJ. Due to such a configuration, the time for a series of steps from when the two-ply sheet PJ is fed from the first sheet tray 11 to when the inner sheet PM is completely inserted in the two-ply sheet PJ is reduced efficiently, and the productivity of the sheet separation device 1 is enhanced. In other words, the time for the operation from the start to the end performed by the sheet separation device 1 is reduced.

Each of the first conveyance roller pair 4, the second conveyance roller pair 5, the third conveyance roller pair 6, a first ejection roller pair 7, and a second ejection roller pair 8 includes a drive roller and a driven roller forming a nip region and conveys the sheet nipped by the nip region. The third sheet conveyance passage K3 includes the second conveyance roller pair 5, the winding roller 20, and the third conveyance roller pair 6, from the upstream side in the sheet conveyance direction. In particular, the winding roller 20, the third conveyance roller pair 6, and the second ejection roller pair 8 are rotatable in a forward direction or in a reverse direction. The third conveyance roller pair 6 and the second ejection roller pair 8 convey the sheet in the forward direction that is the left direction in FIG. 1 and in the reverse direction that is the right direction in FIG. 1. The third conveyance roller pair 6 also functions as a sheet conveyance roller pair that conveys the sheet toward the sheet lamination device 51 or to the purge tray 55.

The first ejection roller pair 7 functions as a sheet conveyance roller pair that conveys and ejects the two-ply sheet PJ' (i.e., the two-ply sheet PJ and the inner sheet PM) after the sheet laminating operation, toward the ejection tray 13.

The switching claw 17 is disposed downstream from the third conveyance roller pair 6 in the forward direction (i.e., the sheet conveyance direction to the lower side in FIG. 1). The switching claw 17 that functions as a switcher or a switching plate switches the direction of conveyance of the sheet (e.g., the two-ply sheet PJ, the inner sheet PM), for example, between the direction conveying the sheet P toward the sheet lamination device 51 and the direction conveying the sheet P toward the purge tray 55. The switching claw 17 is driven by a switching claw motor 171 (see FIG. 2) as described below.

In other words, the switching claw 17 functions as a switcher or a switching plate that switches a first state and a second state. The first state is a state in which the fourth sheet conveyance passage K6 is open and the non-laminated sheet conveyance passage K7 is closed, which is the state illustrated in FIG. 1, for example. The second state is a state in which the fourth sheet conveyance passage K6 is closed and the non-laminated sheet conveyance passage K7 is open.

The switching claw 17 is controlled according to the mode selected by a user (in particular, when the sheet laminating operation is consecutively performed on the plurality of two-ply sheets PJ), so as to appropriately switch the direction of conveyance of the sheet P (the destination of ejection of the sheet P).

Further, the multifed two-ply sheets PJ on which the predetermined process to be performed such as the sheet separating operation has not been performed are to be ejected to the purge tray 55. Details of this operation are described below.

The purge tray 55 is provided with a purge sensor 62 serving as a purge detector or sensor that detects the condition in which the sheet is stacked on the purge tray 55.

Referring to FIG. 1, each of the first sensor 41, the second sensor 42, the third sensor 43, the fourth sensor 44, the fifth sensor 45, the seventh sensor 47, the eighth sensor 48, and purge sensor 62 functions as a sheet detection sensor (sheet detector or sheet sensor) employing a reflection type photosensor that optically detects whether the sheet is present at the position of any of the sheet detection sensors. The first sensor 41 is disposed at the position in proximity to a portion downstream from the first conveyance roller pair 4 in the sheet conveyance direction. The second sensor 42 is disposed at the position in proximity to a portion downstream from the second feed roller 3 in the sheet conveyance direction. The third sensor 43 is disposed at the position in proximity to a portion downstream from the second conveyance roller pair 5 in the sheet conveyance direction. The fourth sensor 44 is disposed at the position in proximity to a portion downstream from the winding roller 20 (i.e., at the lower side of the winding roller 20 in FIG. 1) and upstream from the third conveyance roller pair 6 (i.e., at the upper side of the third conveyance roller pair 6 in FIG. 1) in the sheet conveyance direction. The fifth sensor 45 is disposed downstream from the fourth sheet conveyance passage K6 extending from the sheet separation device 1 to the sheet lamination device 51 (i.e., at the lower side of the third conveyance roller pair 6 in FIG. 1) in the sheet conveyance direction. Further, the seventh sensor 47 is disposed on the first branched sheet conveyance passage K4. The eighth sensor 48 is disposed on the second branched sheet conveyance passage K5. The purge tray 55 is provided with the purge sensor 62 to face the sheet stacked in the purge tray 55.

The sixth sensor 46 functions as an abnormal condition detector or sensor that detects abnormal condition in the sheet separating operation. The detailed description of the sixth sensor 46 is given below.

Figure 2:
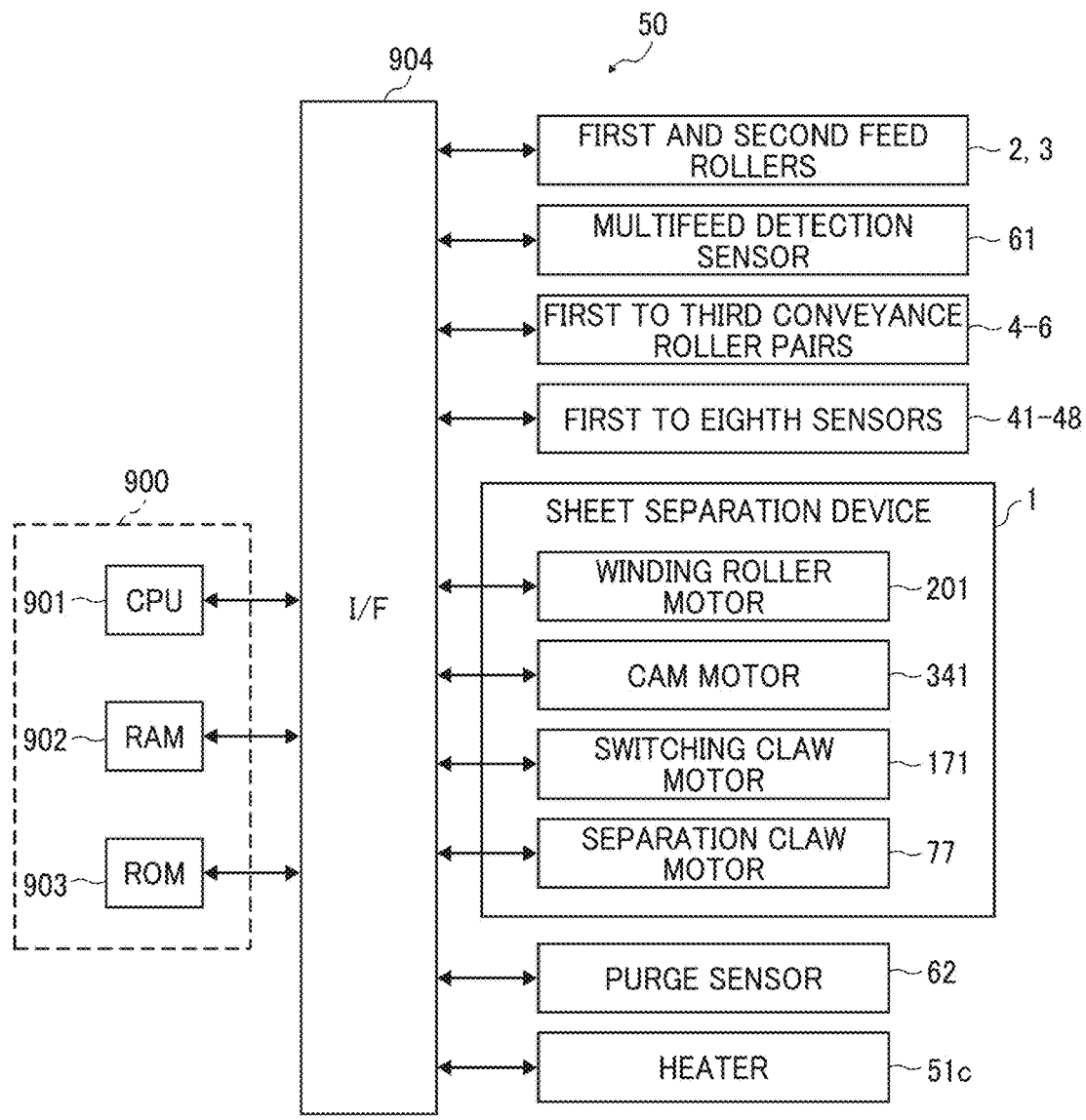
FIG. 2 is a block diagram illustrating a hardware configuration of the control block of the sheet laminator to control the operation of the sheet laminator.

A description is given of the control system of the sheet laminator 50, with reference to FIG. 2.

FIG. 2 is a block diagram illustrating a hardware configuration of the control block of the sheet laminator 50 to control the operation of the sheet laminator 50.

As illustrated in FIG. 2, the sheet laminator 50 has the control system including a central processing unit (CPU) 901, and a random access memory (RAM) 902, a read-only memory (ROM) 903, and an interface (I/F) 904. The CPU 901, the RAM 902, are the ROM 903 are connected via the I/F 904.

The CPU 901 is an arithmetic unit and controls the overall operation of the sheet laminator 50. The RAM 902 is a volatile storage medium that allows data to be read and written at high speed. The CPU 901 uses the RAM 902 as a work area for data processing. The ROM 903 is a read-only non-volatile storage medium that stores programs such as firmware.

The sheet laminator 50 processes, by an arithmetic function of the CPU 901, e.g., a control program stored in the ROM 903 and an information processing program (or application program) loaded into the RAM 902. Such processing configures a software controller including various functional modules of the sheet laminator 50. The software controller thus configured cooperates with hardware resources of the sheet laminator 50 to construct functional blocks to implement functions of the sheet laminator 50.

In other words, the CPU 901, the RAM 902, and the ROM 903 constitute the controller 90 to control the operation of the sheet laminator 50.

The I/F 904 is an interface that connects the first feed roller 2, the second feed roller 3, the multifeed detection sensor 61, the first conveyance roller pair 4, the second conveyance roller pair 5, the third conveyance roller pair 6, the first sensor 41, the second sensor 42, the third sensor 43, the fourth sensor 44, the fifth sensor 45, the sixth sensor 46, the seventh sensor 47, the eighth sensor 48, a winding roller motor 201, a cam motor 341, a switching claw motor 171, a separation member motor 77, the purge sensor 62, and the heater 51c, to the controller 90. The controller 90 controls respective operations of the first feed roller 2, the second feed roller 3, the first conveyance roller pair 4, the second conveyance roller pair 5, the third conveyance roller pair 6, the winding roller motor 201, the cam motor 341, the switching claw motor 171, the separation member motor 77, and the heater 51c, via the I/F 904. The controller 90 acquires respective detection results from the first sensor 41, the second sensor 42, the third sensor 43, the fourth sensor 44, the fifth sensor 45, the sixth sensor 46, the seventh sensor 47, the eighth sensor 48, and the purge sensor 62.

The winding roller motor 201 is a drive unit to drive the winding roller 20.

The cam motor 341 is a drive unit to drive the cam 34. The switching claw motor 171 is a drive unit to drive the switching claws 17.

A description is given of the winding roller 20, with reference to FIGS. 3A, 3B, 4A, 4B, 6B, 6B', 6C, 6C', 6D, and 7A.

Figure 3A:
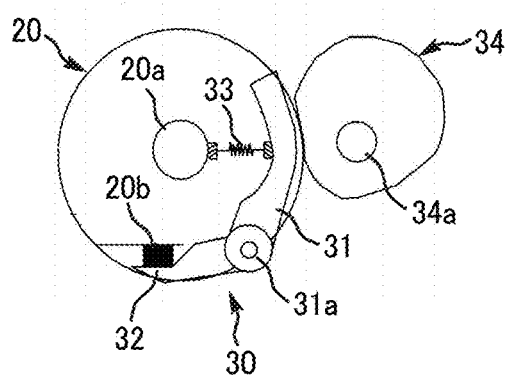
FIG. 3A is a side view of a gripper that has moved to a gripping position in a sheet separation device included in the sheet laminator illustrated in FIG. 1.

FIG. 3A is a side view of a gripper that has moved to a gripping position in a sheet separation device included in the sheet laminator illustrated in FIG. 1.

Figure 3B:
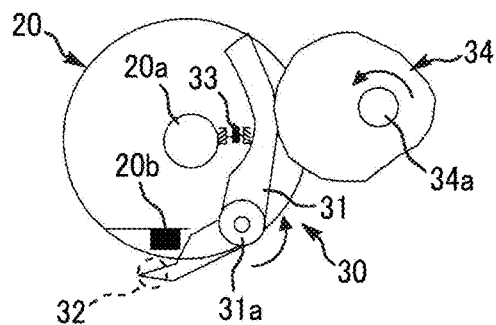
FIG. 3B is a side view of the gripper that has moved to a releasing position in the sheet separation device included in the sheet laminator illustrated in FIG. 1.

FIG. 3B is a side view of the gripper that has moved to a releasing position in the sheet separation device included in the sheet laminator illustrated in FIG. 1.

Figure 4A:
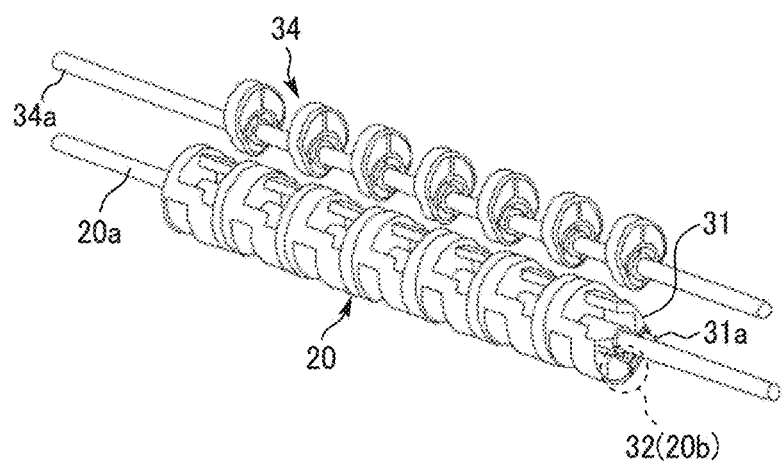
FIG. 4A is a perspective view of the gripper that has moved to the gripping position in the sheet separation device included in the sheet laminator illustrated in FIG. 1.

FIG. 4A is a perspective view of the gripper that has moved to the gripping position in the sheet separation device included in the sheet laminator illustrated in FIG. 1.

Figure 4B:
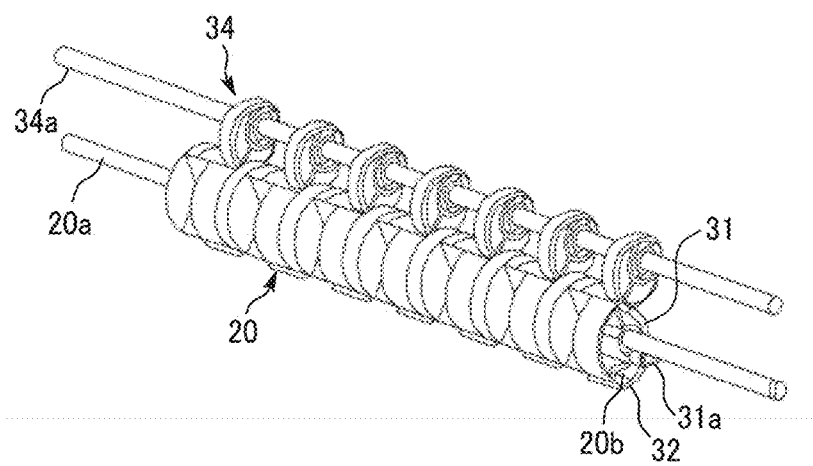
FIG. 4B is a perspective view of the gripper that has moved to the releasing position in the sheet separation device included in the sheet laminator illustrated in FIG. 1.

FIG. 4B is a perspective view of the gripper that has moved to the releasing position in the sheet separation device included in the sheet laminator illustrated in FIG. 1.

FIGS. 5A, 5B, 5C, and 5D are schematic views of the sheet laminator, each illustrating the sheet separating operation performed in the sheet laminator.

Figure 5A:
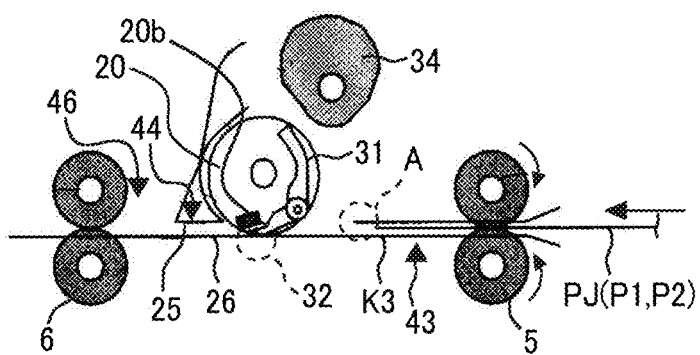
FIGS. 5A, 5B, 5C, and 5D are schematic views of the sheet laminator, each illustrating the sheet separating operation performed in the sheet laminator.
Figure 5B:
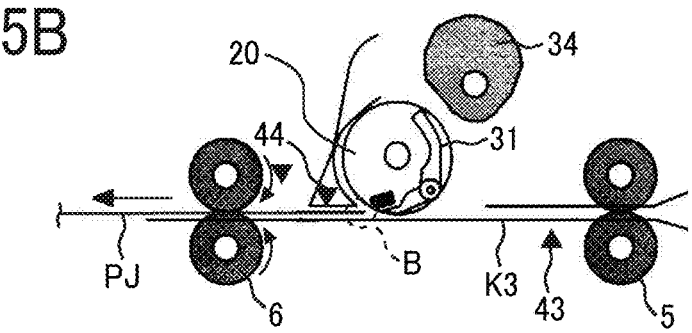
Figure 5C:
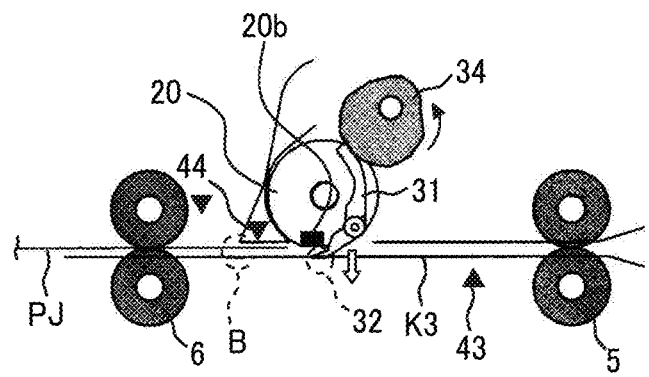
Figure 5D:
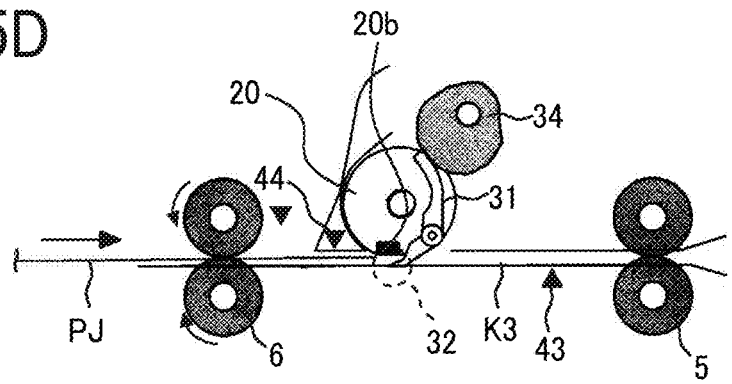
Figure 6A:
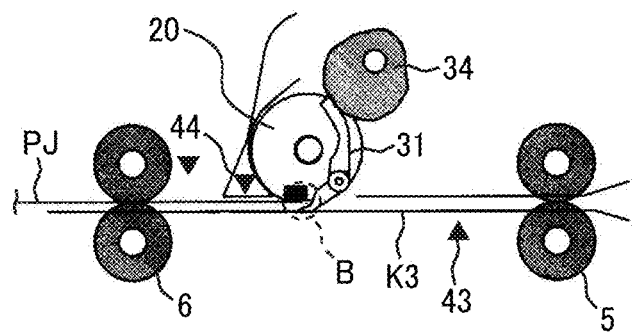
FIGS. 6A, 6B, 6B', 6C, 6C', and 6D are schematic views of the sheet laminator, each illustrating the sheet separating operation performed in the sheet laminator, subsequent from the sheet separating operation of each of FIGS. 5A, 5B, 5C, and 5D.
Figure 6B:
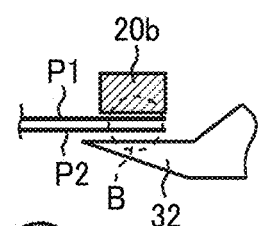
Figure 6B:
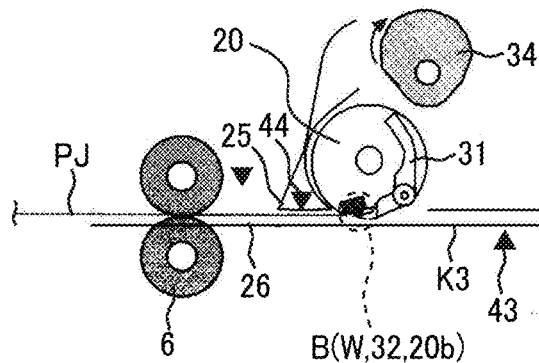

FIGS. 6A, 6B, 6B', 6C, 6C', and 6D are schematic views of the sheet laminator, each illustrating the sheet separating operation performed in the sheet laminator, subsequent from the sheet separating operation of each of FIGS. 5A, 5B, 5C, and 5D.

Figure 7A:
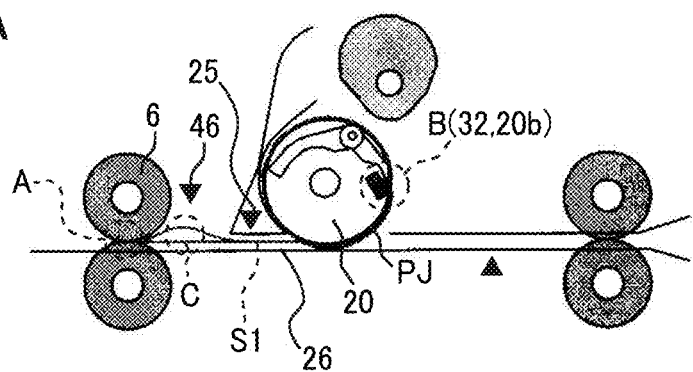
FIGS. 7A, 7B, and 7C are schematic views of the sheet laminator, each illustrating the sheet separating operation performed in the sheet laminator, subsequent from the sheet separating operation of each of FIGS. 6A, 6B, 6B', 6C, 6C', and 6D.
Figure 7B:
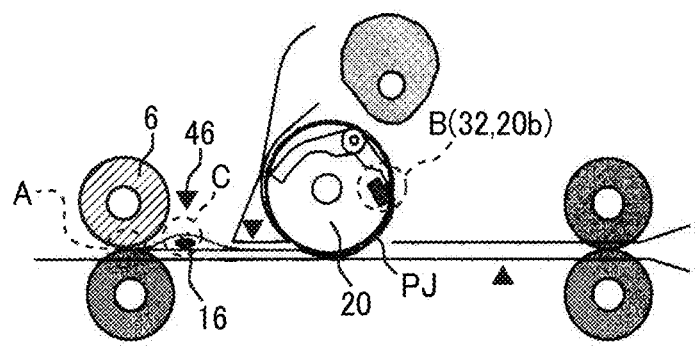
Figure 7C:
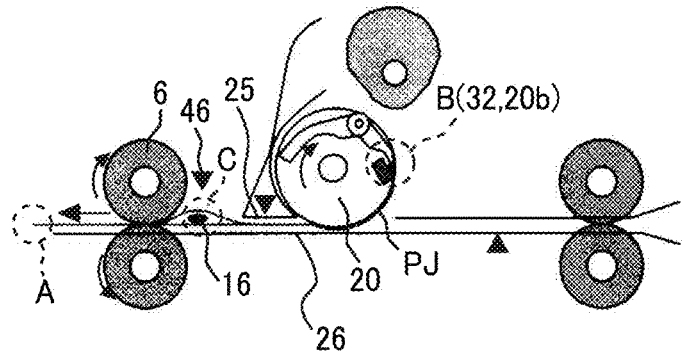

FIGS. 7A, 7B, and 7C are schematic views of the sheet laminator, each illustrating the sheet separating operation performed in the sheet laminator, subsequent from the sheet separating operation of each of FIGS. 6A, 6B, 6B', 6C, 6C', and 6D.

The winding roller 20 is a roller that winds the two-ply sheet PJ, with a gripper 32 serving as a handle grips a gripped portion B of the two-ply sheet PJ at a winding start position W (see FIG. 6B). The gripped portion B is an end of the two-ply sheet PJ that is the other end at which the bonding portion A is formed, which is referred to as the other end of the two-ply sheet PJ. While the gripper 32 grips the gripped portion B of the two-ply sheet PJ, the winding roller 20 rotates in a predetermined rotational direction (i.e., the counterclockwise direction in FIG. 6B) to wind the two-ply sheet PJ around the winding roller 20. The winding roller 20 is rotatable around a rotary shaft 20a in the forward direction or in the reverse direction. The controller 90 controls the winding roller motor 201 that drives the winding roller 20.

To be more specific, the two-ply sheet PJ is fed from the first sheet tray 11, passes through the first sheet conveyance passage K1, and is conveyed by the second conveyance roller pair 5 in the forward direction along the third sheet conveyance passage K3. The two-ply sheet PJ then passes through the winding start position W of the winding roller 20 temporarily and is conveyed to the position of the third conveyance roller pair 6 that is a position at which the trailing end of the two-ply sheet PJ passes the fourth sensor 44 but does not pass through the third conveyance roller pair 6, that is, the position before the third conveyance roller pair 6. Then, the third conveyance roller pair 6 rotates in the reverse direction to convey the two-ply sheet PJ in the reverse direction to the position of the winding roller 20 that is the winding start position W, and the gripper 32 grips the other end (leading end) of the two-ply sheet PJ. The two-ply sheet PJ is further conveyed with the other end (leading end) of the two-ply sheet PJ being gripped by the gripper 32, and the winding roller 20 rotates in the counterclockwise direction in FIG. 1 to wind the two-ply sheet PJ around the winding roller 20.

While FIG. 1 depicts the sheet laminator 50 conveying the sheet (e.g., the two-ply sheet PJ and the inner sheet PM) in the vertical direction, FIGS. 3A to 11E depict the sheet laminator 50 conveying the sheet in the horizontal direction.

Figure 8A:
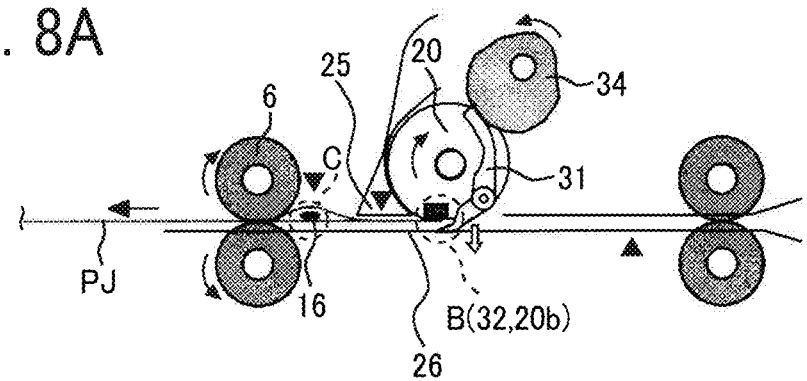
FIGS. 8A, 8B, and 8C are schematic views of the sheet laminator, each illustrating the sheet separating operation performed in the sheet laminator, subsequent from the sheet separating operation of FIGS. 7A, 7B, and 7C.
Figure 8B:
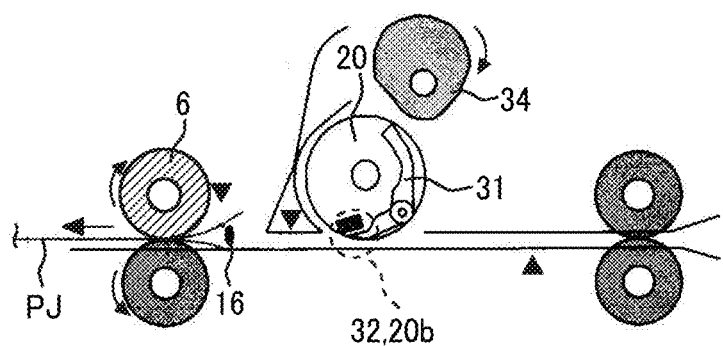
Figure 8C:
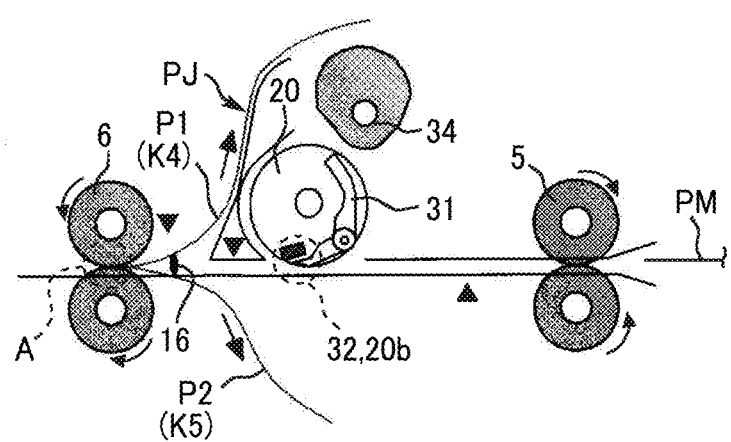

FIGS. 8A, 8B, and 8C are schematic views of the sheet separation device, each illustrating the sheet separating operation performed in the sheet separation device, subsequent from the sheet separating operation of FIGS. 7A, 7B, and 7C.

Figure 9A:
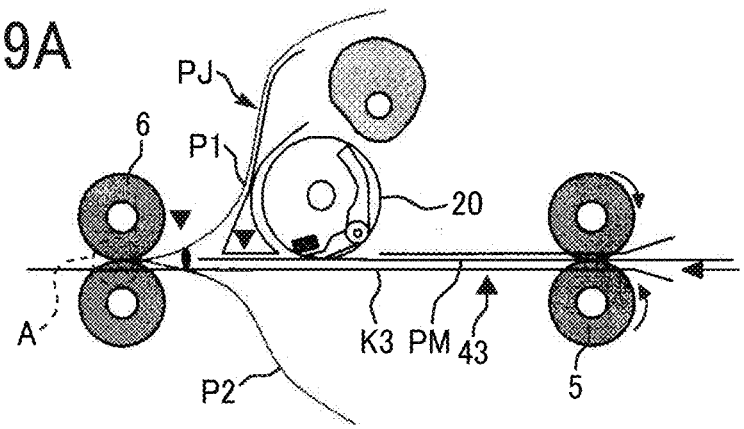
FIGS. 9A, 9B, and 9C are schematic views of the sheet laminator, each illustrating the sheet separating operation performed in the sheet laminator, subsequent from the sheet separating operation of FIGS. 8A, 8B, and 8C.
Figure 9B:
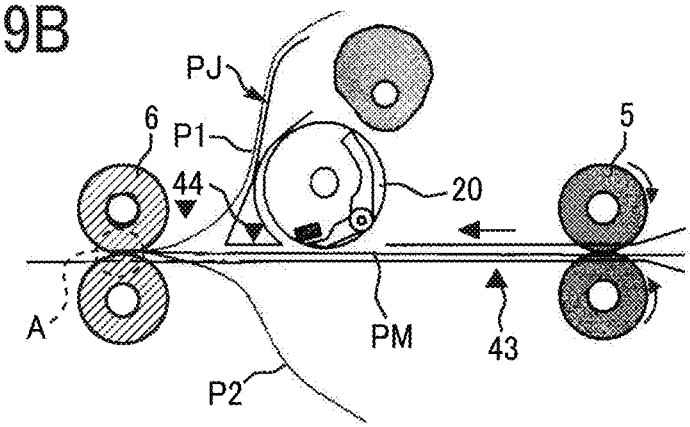
Figure 9C:
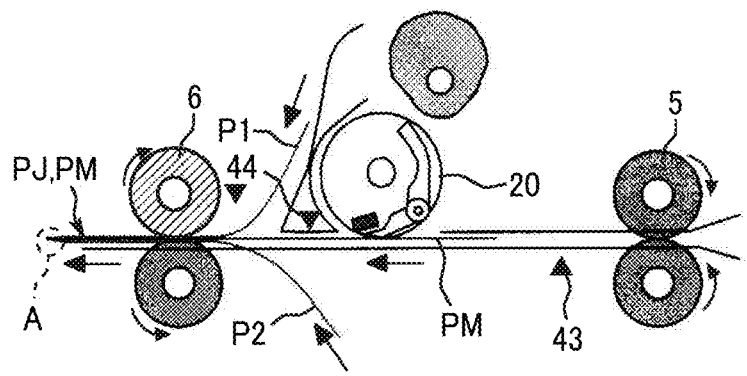

FIGS. 9A, 9B, and 9C are schematic views of the sheet separation device, each illustrating the sheet separating operation performed in the sheet separation device, subsequent from the sheet separating operation of FIGS. 8A, 8B, and 8C.

Figure 10:
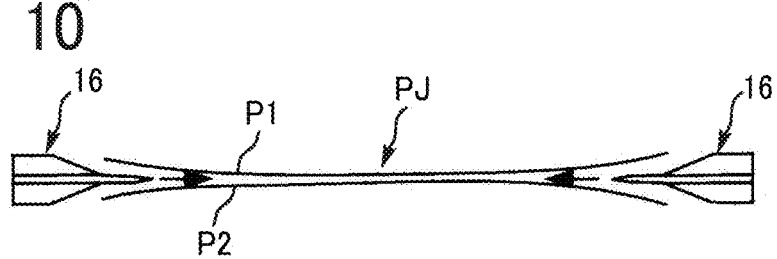
FIG. 10 is a schematic view of separation members inserted into a two-ply sheet in a width direction of the two-ply sheet.

FIG. 10 is a schematic view of separation members inserted into the two-ply sheet in the width direction of the two-ply sheet.

FIGS. 11A, 11B, 11C, 11D, and 11E are perspective views, each illustrating the operation of the separation members.

Figure 6C:
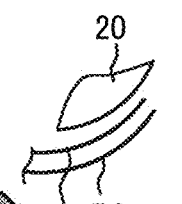
Figure 6C:
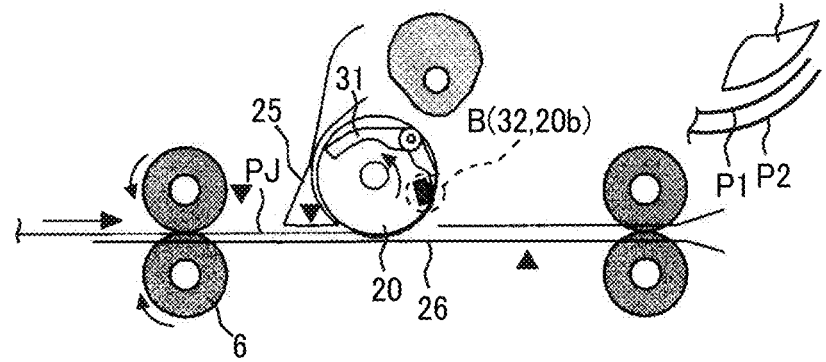
Figure 6D:
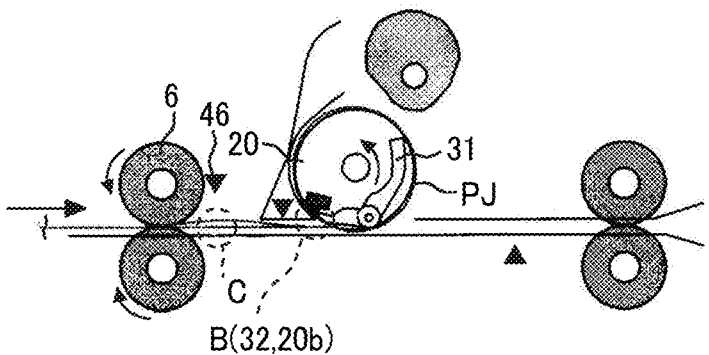

With reference to FIG. 6C', when the two-ply sheet PJ is wound around the winding roller 20, the length of the two-ply sheet PJ wound around the winding roller 20 is proportional to the diameter of the winding roller 20. Since the first sheet P1 is on the inner side to the center of the winding roller 20, in other words, is closer to the inner circumferential surface of the winding roller 20, and a second sheet P2 on the outer side to the center of the winding roller 20, in other words, is closer to the outer circumferential surface of the winding roller 20, the length of the first sheet P1 wound around the winding roller 20 is shorter than the length of the second sheet P2 wound around the winding roller 20. As a result, displacement occurs in the part of the two-ply sheet PJ in which the sheet P1 is in close contact with the sheet P2 (in other words, the part in which the sheet P1 sticks to the sheet P2) other than the bonding portion A and the gripped portion B. The displacement causes the first sheet P1 to slack and bend toward the second sheet P2, forming a gap C between the two sheets, which are the first sheet P1 and the second sheet P2, in proximity to the bonding portion A of the two-ply sheet PJ, as illustrated in FIGS. 6D and 7A. In other words, when the first sheet P1 that is placed on the second sheet P2 is warped upward, the gap C is formed between the first sheet P1 and the second sheet P2 at one end of the two-ply sheet PJ.

As described above, the first sheet P1 and the second sheet P2 that are in close contact with each other without any gap are separated (peeled) from each other.

Particularly in the present embodiment, in order to significantly form the gap C as described above, in other words, in order to increase the difference between the length of the first sheet P1 wound around the winding roller 20 and the length of the second sheet P2 wound around the winding roller 20, the two-ply sheet PJ is wound around the winding roller 20 at least one round.

As described above, in the present embodiment, by providing the winding roller 20 around which the two-ply sheet PJ is wound, the two-ply sheet PJ is separatable without significantly increasing the size and cost of the sheet laminator 50.

As illustrated in FIG. 6B', the gripper 32 in the present embodiment grips the gripped portion B of the two-ply sheet PJ without contacting the end face of the other end (the gripped portion B) of the two-ply sheet PJ.

More specifically, the gripper 32 nips and grips the gripped portion B of the two-ply sheet PJ between the gripper 32 and a receiving portion 20b of the winding roller 20 without causing any member to contact the end face of the other end of the two-ply sheet PJ, in other words, without causing any member to hit or contact the end face of the two-ply sheet PJ. The receiving portion 20b of the winding roller 20 is a part of the outer circumferential portion of the winding roller 20 and is arranged to be exposed outwardly and facing the gripper 32.

To be more specific, the two-ply sheet PJ is not nipped and gripped by the gripper 32 and the receiving portion 20b of the winding roller 20 when a specific member such as the gripper 32 contacts the end face of the other end (i.e., the leading end face). The two-ply sheet PJ is nipped and gripped by the gripper 32 and the receiving portion 20b while the end face of the other end (i.e., the leading end face) does not contact any member. At this time, the gripper 32 is located close to the second sheet P2 on the outer side to the center of the winding roller 20 and the receiving portion 20b is located close to the first sheet P1 on the inner side to the center of the winding roller 20.

Accordingly, when compared with a configuration in which the leading end face of the two-ply sheet PJ contacts a member, the above-described structure according to the present embodiment can reduce damage on the two-ply sheet PJ (particularly, the leading end). In particular, once the leading end face of the two-ply sheet PJ is damaged, it is difficult to perform the sheet laminating operation on the damaged leading end face. For this reason, the configuration of an embodiment of the present disclosure is useful.

In the present embodiment, the bonding portion A of the two-ply sheet PJ wound around the winding roller 20 is the one end of the two-ply sheet PJ. The one end is opposite to the other end functioning as the gripped portion B.

In the present embodiment, at least the gripper 32 (handle) or the receiving portion 20b is made of elastic material such as rubber.

According to this configuration, when compared with a known configuration in which the gripper 32 and the receiving portion 20b have rigid bodies made of metal or resin, the above-described configuration according to the present embodiment enhances the gripping force to grip the two-ply sheet PJ and prevents the surfaces of the two-ply sheet PJ from being damaged. In particular, when the gripper 32 and the receiving portion 20b are made of the elastic material, this configuration can easily achieve the above-described effect.

As illustrated in FIGS. 3A, 3B, 4A, and 4B, the moving mechanism 30 moves the gripper 32 between a gripping position (e.g., the position illustrated in FIGS. 3A and 4A) at which the gripper 32 can grip the two-ply sheet PJ and a releasing position (e.g., the position illustrated in FIGS. 3B and 4B) at which the gripper 32 is released from the gripping position.

More specifically, the moving mechanism 30 includes an arm 31, a compression spring 33, a cam 34, and the cam motor 341 (see FIG. 2). The compression spring 33 functions as a biasing member. The cam motor 341 drives to rotate the cam 34 in the forward direction or the reverse direction.

The arm 31 holds the gripper 32. The arm 31 and the gripper 32 are held together by the winding roller 20 to be rotatable together around a support shaft 31a. In the present embodiment, the gripper 32 is coupled to the tip of the arm 31, and the gripper 32 and the arm 31 are made (held) as a single unit. Alternatively, the gripper 32 and the arm 31 may be made as separate members, and the gripper 32 may be disposed on the arm 31, in other words, may be held by the arm 31. In any case, the arm 31 holding the gripper 32 rotates around the rotary shaft 20a together with the winding roller 20.

The compression spring 33 functions as a biasing member that biases the arm 31 so that the gripper 32 moves from the releasing position illustrated in FIG. 3B to the gripping position illustrated in FIG. 3A. To be more specific, one end of the compression spring 33 is coupled to a fixed position in proximity to the rotary shaft 20a, and the other end of the compression spring 33 is coupled to one end of the arm 31 that is an end opposite to the other end of the arm 31 coupled to the gripper 32 with respect to the support shaft 31a.

The cam 34 pushes the arm 31 against the biasing force of the compression spring 33 that functions as the biasing member, so that the gripper 32 moves from the gripping position illustrated in FIG. 3A to the releasing position illustrated in FIG. 3B. The cam motor 341 that is controlled by the controller 90 drives the cam 34 to rotate in the forward direction or the reverse direction at a desired rotation angle. The cam 34 is held by the housing of the sheet laminator 50 so as to be rotatable around a cam shaft 34a separately from the winding roller 20.

In the moving mechanism 30 having the above-described configuration, as illustrated in FIGS. 3A and 4A, when the cam 34 is not in contact with the arm 31, the arm 31 is biased by the compression spring 33 to press the gripper 32 against the receiving portion 20b. This state is referred to as a closed state. In the closed state, the gripper 32 and the receiving portion 20b grip the two-ply sheet PJ.

By contrast, as illustrated in FIGS. 3B and 4B, while the cam 34 is contacts and presses the arm 31, the arm 31 rotates in the counterclockwise direction in FIG. 3B about the support shaft 31a against the biasing force of the compression spring 33, so that the gripper 32 separates from the receiving portion 20b. This state is referred to as an open state. In the open state, the gripper 32 and the receiving portion 20b cannot grip the two-ply sheet PJ, which is also referred to as a grip release state.

In the present embodiment, as illustrated in FIGS. 4A and 4B, the winding roller 20 includes a plurality of roller portions (i.e., seven roller portions in the present embodiment) separated in the axial direction of the winding roller 20. Similarly, the cam 34 includes a plurality of cam portions separated in the axial direction of the cam 34 so that the divided positions of the plurality of cam portions of the cam 34 respectively meet and face the plurality of roller portions of the winding roller 20.

Setting portions provided at given intervals in the axial direction to grip the two-ply sheet PJ as described above, that is, not setting the entire area of the winding roller 20 and the cam 34 in the axial direction to grip the two-ply sheet PJ share load for gripping the two-ply sheet PJ. The above-described configuration is useful when a gripping force for gripping the two-play sheet PJ increases.

A description is given of the fourth sensor 44 in the sheet laminator 50 according to the present embodiment, with reference to FIGS. 1, 5D, and 6A.

The fourth sensor 44 functions as a sheet detection sensor to detect the two-ply sheet PJ conveyed between the winding roller 20 and the third conveyance roller pair 6. The fourth sensor 44 detects the leading end of the two-ply sheet PJ conveyed by the third conveyance roller pair 6 toward the winding roller 20 in the sheet conveyance direction. Based on the detection results detected by the fourth sensor 44, the controller 90 controls the moving mechanism 30.

More specifically, the fourth sensor 44 is disposed in the sheet conveyance passage between the winding roller 20 and the third conveyance roller pair 6. As illustrated in FIGS. 5D and 6A, when the third conveyance roller pair 6 conveys the two-ply sheet PJ in the reverse direction toward the position of the winding roller 20 in the reverse direction, with the gripped portion B of the two-ply sheet PJ being the leading end, the fourth sensor 44 detects the leading end (i.e., the end of the gripped portion B) of the two-ply sheet PJ. In response to the detection timing at which the fourth sensor 44 detects the leading end (in the reverse direction) of the gripped portion B, the controller 90 adjusts and controls the timing to stop the two-ply sheet PJ at the gripping position and the timing at which the gripper 32 grips the gripped portion B. To be more specific, after the predetermined time has passed since the fourth sensor 44 detected the leading end of the two-ply sheet PJ, the third conveyance roller pair 6 stops conveyance of the two-ply sheet PJ in the reverse direction, and the cam 34 rotates to pivot the arm 31 of the moving mechanism 30 so that the gripper 32 moves from the releasing position illustrated in FIG. 3B to the gripping position illustrated in FIG. 3A.

The above-described control accurately performs an operation in which the end face of the two-ply sheet PJ is nipped by the gripper 32 and the receiving portion 20b without contacting the end face of the two-ply sheet PJ on any member.

As described above, the third conveyance roller pair 6 is a sheet conveyance roller pair that conveys the two-ply sheet PJ with the other end (i.e., the gripped portion B) as a leading end, toward the winding start position W of the winding roller 20 in the third sheet conveyance passage K3 (sheet conveyance passage) between the third conveyance roller pair 6 and the winding roller 20.

A description is given of the separation members 16 each functioning as a separator, with reference to FIGS. 7A, 7B, 7C, 10, 11A, 11B, 11C, 11D, 11E, and 13.

Figure 13:
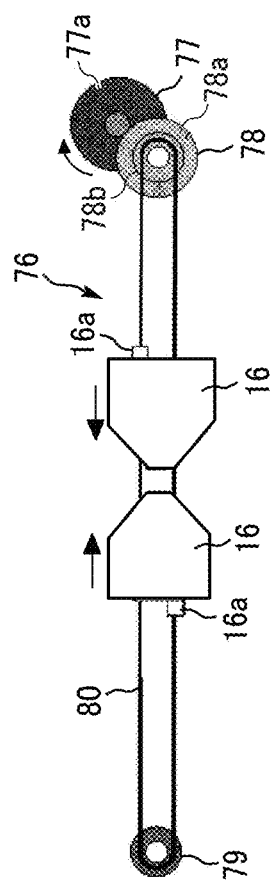
FIG. 13 is a diagram illustrating the configuration of a moving mechanism to move the separation members.

FIG. 13 is a diagram illustrating the configuration of the moving mechanism 30 to move the separation members 16.

Figure 11A:
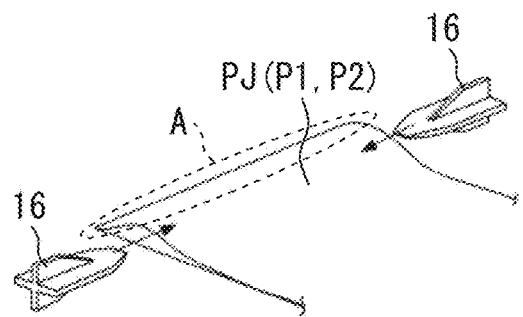
FIGS. 11A, 11B, 11C, 11D, and 11E are perspective views, each illustrating the operation of the separation members.

Each of the separation members 16 is a plate-shaped member that moves from the standby position illustrated in FIG. 11A to be inserted into the gap C formed in the non-bonding portion (the gripped portion) between the first sheet P1 and the second sheet P2 of the two-ply sheet PJ at a predetermined position of the two-ply sheet PJ.

To be more specific, the separation members 16 are inserted into the gap C formed between the first sheet P1 and the second sheet P2 at a position between the winding roller 20 and the third conveyance roller pair 6 from the standby positions outside both ends of the two-ply sheet PJ in the width direction of the two-ply sheet PJ, with respect to the two-ply sheet PJ when the other end (i.e., the gripped portion B) is wound by the winding roller 20 and the one end (i.e., the bonding portion A) is nipped by the third conveyance roller pair 6.

More specifically, in the present embodiment, the separation members 16 are a pair of separation members each functioning as a pair of separators or separation plates disposed at both sides of the third conveyance passage K3 in the width direction (i.e., the direction perpendicular to a plane on which FIGS. 7A to 7C are illustrated and the horizontal direction in FIGS. 10 and 13). As illustrated in FIGS. 11A to 11E, the length of each of the separation members 16 in the vertical direction (i.e., the thickness direction of the two-ply sheet PJ) gradually increases from the tip of each of the separation members 16 in proximity to the center in the width direction of the two-ply sheet PJ, to the rear end of each of the separation members 16 in proximity to the outsides in the width direction of the two-ply sheet PJ. Further, the separation members 16 are movable in the width direction of the two-ply sheet PJ by a driving device 76 (see FIG. 13) controlled by the controller 90.

Figure 11B:
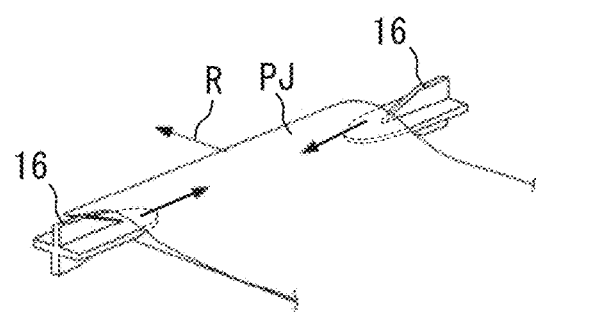

The separation members 16 having the above-described structure ordinarily stand by at respective standby positions at which the separation members 16 do not interfere with conveyance of the sheet such as the two-ply sheet PJ in the third sheet conveyance passage K3. As illustrated in FIG. 11A, the standby positions of the separation members 16 are outside of the two-ply sheet PJ (including the first sheet P1 and the second sheet P2) in the width direction of the two-ply sheet PJ. Subsequently, as illustrated in FIGS. 10 and 11B, the separation members 16 enter the gap C in the two-ply sheet PJ when separating the two-ply sheet PJ (including the first sheet P1 and the second sheet P2). As a result, the separation members 16 secure the gap C to be relatively large.

As illustrated in FIG. 13, the driving device 76 that moves the separation members 16 as a pair of separation members in the width direction includes the separation member motor 77, a gear pulley 78, a pulley 79, and a timing belt 80. The gear pulley 78 includes a gear portion 78a and a pulley portion 78b in steps. The gear portion 78a meshes with a motor gear 77a mounted on the motor shaft of the separation member motor 77. The pulley portion 78b stretches and supports the timing belt 80 with the pulley 79. One of the separation members 16 serving as a pair of separation members includes a fixed portion 16a that is fixed to a part of the belt surface of the timing belt 80 that is the upper side of the belt surface in FIG. 13. The other one of the separation members 16 serving as a pair of separation members includes another fixed portion 16a that is fixed to a part of the other belt surface of the timing belt 80 that is the lower side of the belt surface in FIG. 13.

In the driving device 76 having the above-described configuration, the separation member motor 77 drives to rotate the motor shaft in a direction indicated by arrow in FIG. 13 (i.e., in the clockwise direction), the gear pulley 78 rotates in the counterclockwise direction, the timing belt 80 rotates in the counterclockwise direction, and the separation members 16 serving as a pair of separation members or plates moves from the outside in the width direction of the two-ply sheet PJ toward the center in the width direction of the two-ply sheet PJ (in other words, the separation members 16 approaches each other). On the other hand, when the separation member motor 77 drives to rotate the motor shaft in the direction opposite to the direction indicated by arrow in FIG. 13, the separation members 16 serving as a pair of separation members or plates moves away from the center in the width direction of the two-ply sheet PJ toward the outside in the width direction of the two-ply sheet PJ (in other words, the separation members 16 moves in a direction away from each other).

With the separation members 16 being inserted into the gap C in the two-ply sheet PJ, the separation members 16 relatively move from the one end of the two-ply sheet PJ (in proximity to the bonding portion A) toward the other end of the two-ply sheet PJ (in proximity to the gripped portion B). Then, the separation members 16 move in the width direction between the first sheet P1 and the second sheet P2 at the other end of the two-ply sheet PJ.

Figure 11C:
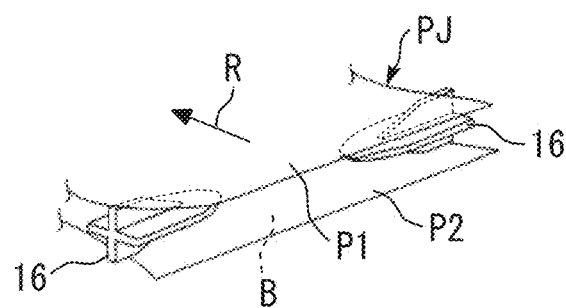
Figure 11D:
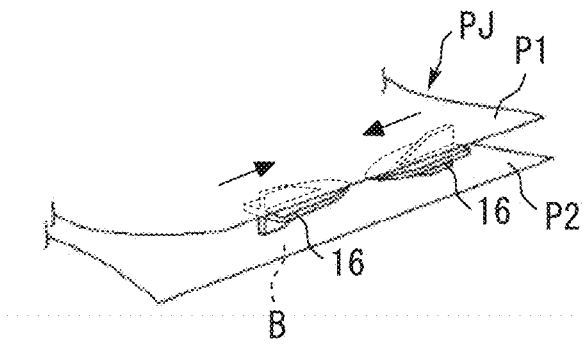

Specifically, the controller 90 controls the driving device 76 (see FIG. 13) to move the separation members 16 serving as a pair of separation members or plates as follows. As illustrated in FIGS. 11B and 11C, the separation members 16 are inserted into both ends of the gap C in the width direction of the two-ply sheet PJ and relatively move to the other end of the two-ply sheet PJ that is the gripped portion B. After the separation members 16 serving as a pair of separation members or plates have relatively moved to the other end of the two-ply sheet PJ, as illustrated in FIG. 11D, the separation members 16 on the other end of the two-ply sheet PJ move in the width direction from both ends of the two-ply sheet PJ to the center of the two-ply sheet PJ between the first sheet P1 and the second sheet P2.

In order to cause the separation members 16 to move as described above, the driving device 76 causes the separation members 16 to move from the standby positions to the positions at which the separation members 16 come close to each other.

Such a mechanism as the above-described driving device 76 includes the winding roller 20 to wind the two-ply sheet PJ and the separation members 16 to be inserted into the two-ply sheet PJ so as to separate the two-ply sheet PJ. When compared with a mechanism using a large-scale device such as a vacuum device to separate the two-ply sheet PJ, the mechanism such as the above-described driving device 76 reduces the size of the sheet separation device 1 included in the sheet laminator 50. In other words, without increasing the size of the sheet laminator 50, the above-described mechanism can preferably separate the first sheet P1 and the second sheet P2 of the two-ply sheet PJ.

In particular, since the separation members 16 according to the present embodiment move over substantially the entire area in the width direction of the two-ply sheet PJ on the other end of the two-ply sheet PJ (i.e., the trailing end of the two-ply sheet PJ), the separation members 16 sufficiently separate (peel) the other ends of the first sheet P1 and the second sheet P2 of the two-ply sheet PJ, the other ends being opposite the bonding portion A. For this reason, it is less likely that the above-described configuration causes an inconvenience that the other end of the two-ply sheet PJ that is opposite the bonding portion A is not sufficiently separated, and that this insufficient separation prevents the inner sheet PM (see FIG. 11E) from being inserted into the other end of the two-ply sheet PJ from the other end of the two-ply sheet PJ. Further, the above-described configuration allows the separation members 16 to easily function as a switcher or switching plates, in other words, to separately guide the first sheet P1 and the second sheet P2 to the first branched sheet conveyance passage K4 and the second branched sheet conveyance passage K5, respectively. A detailed description of the separation members 16 serving as a switcher is given below.

A description is given of the separation members 16 each functioning as a switcher or a switching plate.

In the present embodiment, the separation members 16 functioning as a separator or separation plates also function as a switcher or switching plates that guide the first sheet P1 and the second sheet P2 separated by the separation members 16, to the first branched sheet conveyance passage K4 and the second branched sheet conveyance passage K5 branching off in different directions, respectively.

More specifically, as illustrated in FIG. 8C, the first branched sheet conveyance passage K4 and the second branched sheet conveyance passage K5 branch off in different directions from the third sheet conveyance passage K3 between the winding roller 20 and each of the separation members 16 (separation plates). To be more specific, the first branched sheet conveyance passage K4 branches upward from the third sheet conveyance passage K3, and the second branched sheet conveyance passage K5 branches downward from the third sheet conveyance passage K3.

As illustrated in FIGS. 8A, 8B, and 8C, after the separation members 16 are inserted into the gap C, the third conveyance roller pair 6 conveys the two-ply sheet PJ to the one end (i.e., the left side in FIGS. 8A, 8B, and 8C) so that the winding of the other end of the two-ply sheet PJ on the winding roller 20 is released (see FIGS. 11A, 11B, and 11C). After the winding of the other end of the two-ply sheet PJ on the winding roller 20 is released, the separation members 16 move to the center in the width direction of the two-ply sheet PJ as illustrated in FIG. 11D, and then stop at the center in the width direction of the two-ply sheet PJ. Then, while the separation members 16 remain at the center in the width direction of the two-ply sheet PJ, the third conveyance roller pair 6 conveys the two-ply sheet PJ to the other end (i.e., the right side in FIGS. 8A, 8B, and 8C) again. Then, the separation members 16 guide the first sheet P1 and the second sheet P2 separated by the separation members 16, to the first branched sheet conveyance passage K4 and the second branched sheet conveyance passage K5, respectively. In other words, the controller 90 causes the separation members 16 to guide the two sheets (i.e., the first sheet P1 and the second sheet P2) separated by the separation members 16, to the two branched sheet conveyance passages (i.e., the first branched sheet conveyance passage K4 and the second branched sheet conveyance passage K5) separately. Consequently, the first sheet P1 is guided to the first branched sheet conveyance passage K4, and the second sheet P2 is guided to the second branched sheet conveyance passage K5. Subsequently, as illustrated in FIGS. 9A, 9B, 9C, and 11E, the controller 90 causes the separation members 16 to move to the standby positions, and then causes the second conveyance roller pair 5 to convey the inner sheet PM to the one end of the third sheet conveyance passage K3 (i.e., the right side in FIGS. 9A, 9B, and 9C), to insert the inner sheet PM between the first sheet P1 and the second sheet P2 separated from the two-ply sheet PJ.

As described above, each of the separation members 16 in the present embodiment functions as a separator or a separation plate that separates (in other words, peels) the non-bonding portion of the first sheet P1 and the second sheet P2 of the two-ply sheet PJ, and also functions as a switcher or switching plates that separately guide the separated two sheets, which are the first sheet P1 and the second sheet P2, to the first branched sheet conveyance passage K4 and the second branched sheet conveyance passage K5, respectively. Accordingly, the above-described configuration of the separation members 16 reduces the size and cost of the sheet laminator 50, when compared with the configuration of a sheet separation device including the separator and the switcher as different units. In other words, the above-described configuration of the separation members 16 efficiently and preferably can separate the first sheet P1 and the second sheet P2 of the two-ply sheet PJ.

The seventh sensor 47 optically detects that the first sheet P1 separated from the second sheet P2 is successfully conveyed to the first branched sheet conveyance passage K4. Further, the eighth sensor 48 optically detects that the second sheet P2 separated from the first sheet P1 is successfully conveyed to the second branched sheet conveyance passage K5. Each separation member 16 in the present embodiment functions as a separator (separation plates) and a switcher (switching plates). However, the sheet separation device 1 of the sheet laminator 50 according to the present embodiment may further include a member that functions as a switcher (switching plates), different from the separation members 16 that function as separation members or plates.

A description is now given of the first guide 25 included in the sheet laminator 50 according to the present embodiment, with reference to FIGS. 7A and 7C.

The first guide 25 is disposed between the winding roller 20 and each of the separation members 16 in the third sheet conveyance passage K3. The first guide 25 functions as a limiter to limit the amount of slack (in other words, a deflection amount) of the first sheet P1 that is wound around the winding roller 20 on the inner side of the first sheet P1 and the second sheet P2 of the two-ply sheet PJ wound around the winding roller 20.

More specifically, the first guide 25 that functions as a limiter is a conveyance guide disposed on the side in which the winding roller 20 is disposed with respect to an imaginary plane 51 (i.e., above the imaginary plane 51 in FIG. 7A) in the third sheet conveyance passage K3. The imaginary plane 51 is an imaginary plane passing through the winding start position W of the winding roller 20 and the nip region of the third conveyance roller pair 6 in the third sheet conveyance passage K3 (see FIG. 7A). The first guide 25 has a shape like substantially a triangular prism having a plane separated from the winding roller 20 by a predetermined gap along the outer circumferential surface of the winding roller 20, and the plane covers a part of the outer circumferential surface of the winding roller 20. The first guide 25 functions as a conveyance guide of the third sheet conveyance passage K3 and a conveyance guide of the first branched sheet conveyance passage K4. In other words, the first guide 25 guides the sheet conveyed through the third sheet conveyance passage K3, the sheet conveyed through the first branched sheet conveyance passage K4, and the sheet wound around the winding roller 20.

In particular, in the third sheet conveyance passage K3, the first guide 25 limits upward bending of the two-ply sheet PJ (in particular, upward bending of the first sheet P1) between the winding roller 20 and the third conveyance roller pair 6. Due to such a configuration, the gap C in the two-ply sheet PJ that is formed by bending the first sheet P1 upward is intensively formed between the first guide 25 and the third conveyance roller pair 6. Accordingly, the above-described configuration increases the size of the gap C without increasing the winding amount of the two-ply sheet PJ wound around the winding roller 20, and the separation members 16 are smoothly inserted into the gap C to separate the two-ply sheet PJ.

Further, a description is given of a second guide 26 included in the sheet laminator 50 according to the present embodiment, with reference to FIGS. 7A and 7C.

The second guide 26 is disposed between the winding roller 20 and each of the separation members 16 in the third sheet conveyance passage K3. The second guide 26 functions as a guide to guide the second sheet P2 that is an outer sheet of the two sheets P1 and P2 of the two-ply sheet PJ wound around the winding roller 20.

More specifically, the second guide 26 that functions as a guide is a sheet conveyance guide disposed on the side in which the winding roller 20 is not disposed with respect to the imaginary plane 51 (i.e., below the imaginary plane 51) in FIG. 7A, in the third sheet conveyance passage K3. The second guide 26 is disposed to face the lower face of the sheet from a portion close to and upstream from the second conveyance roller pair 5 in the sheet conveyance direction to a portion close to and downstream from the third conveyance roller pair 6 in the sheet conveyance direction. In other words, the second guide 26 guides the sheet conveyed in the third sheet conveyance passage K3.

In particular, in the third sheet conveyance passage K3 between the winding roller 20 and the third conveyance roller pair 6, a clearance between the first guide 25 and the second guide 26 is set to be a value by which the sheet having the largest thickness can be conveyed. Since this setting limits a gap between the first sheet P1 and the second sheet P2 of the two-ply sheet PJ so as not to be too large between the first guide 25 and the second guide 26, the gap C in the two-ply sheet PJ (in particular, the upward bending of the first sheet P1) is intensively formed. Accordingly, the separation members 16 can be smoothly inserted into the gap C to separate the two-ply sheet PJ.

A description is given of the sixth sensor 46, with reference to FIGS. 7A, 7B, and 7C.

The sixth sensor 46 functions as an abnormal condition detection sensor to detect abnormal condition in which the gap C formed between the first sheet P1 and the second sheet P2 at a predetermined position (i.e., the position between the third conveyance roller pair 6 and the winding roller 20) is not larger than a predetermined size before the separation members 16 move from the standby positions (i.e., before the separation members 16 move from the standby positions illustrated in FIG. 13 to the separation positions illustrated in FIGS. 10 and 11A). The predetermined size is the size of the gap C into which the separation members 16 are inserted. In other words, the sixth sensor 46 that functions as the abnormal condition detector or sensor detects the abnormal condition in which the gap C formed between the first sheet P1 and the second sheet P2 at the predetermined position is not larger than the predetermined size before the separation members 16 are inserted into the gap C.

Further in other words, at a timing that is to form the gap C between the first sheet P1 and the second sheet P2, as illustrated in FIGS. 6D and 7A, the sixth sensor 46 that functions as an abnormality detector or sensor detects the abnormal condition such as a state in which the gap C is not formed at all or a state in which the sufficient gap C is not formed.

In the present embodiment, the controller 90 notifies the user of abnormal condition when the abnormal condition is detected by the sixth sensor 46 (serving as an abnormal condition detector). More specifically, as illustrated in FIG. 1, the sheet laminator 50 includes the operation display panel 49 serving as an operation display device on the exterior of the sheet laminator 50 to display various kinds of information about the sheet laminator 50 and input various kinds of commands of the sheet laminator 50 by the user. When the controller 90 determines the abnormal condition of the two-ply sheet PJ based on the results detected by the sixth sensor 46, in other words, when the two-ply sheet PJ does not have the sufficiently large gap C having a sufficient clearance in the two-ply sheet PJ, the controller 90 controls the operation display panel 49 to display that the abnormal condition is detected. For example, the operation display panel 49 displays "Since an abnormal condition has occurred, the process of inserting the inner sheet is stopped. Please check the setting direction of the two-ply sheet in the unit sheet tray.

If the setting direction is correct and similar abnormal conditions are repeated, please contact a service person."

The above-described sixth sensor 46 serving as an abnormal condition detector or sensor may be, for example, a lever type sensor that comes into contact with the upper first sheet P1 placed on the two-ply sheets PJ forming the gap C larger than the predetermined size.

A description is given of the operations performed in the sheet laminator 50 when the sheet separating operation and the sheet inserting operation are performed on the plurality of two-ply sheets PJ in the normal condition (i.e., not in the abnormal condition), with reference to FIGS. 5A to 9C.

Further, in the description of the operations, the operations of the separation members 16 are appropriately described with reference to FIGS. 10, 11A, 11B, 11C, 11D, and 11E, and the control flow is described with reference to a flowchart of FIG. 12, that is, FIGS. 12A and 12B.

Figure 12A:
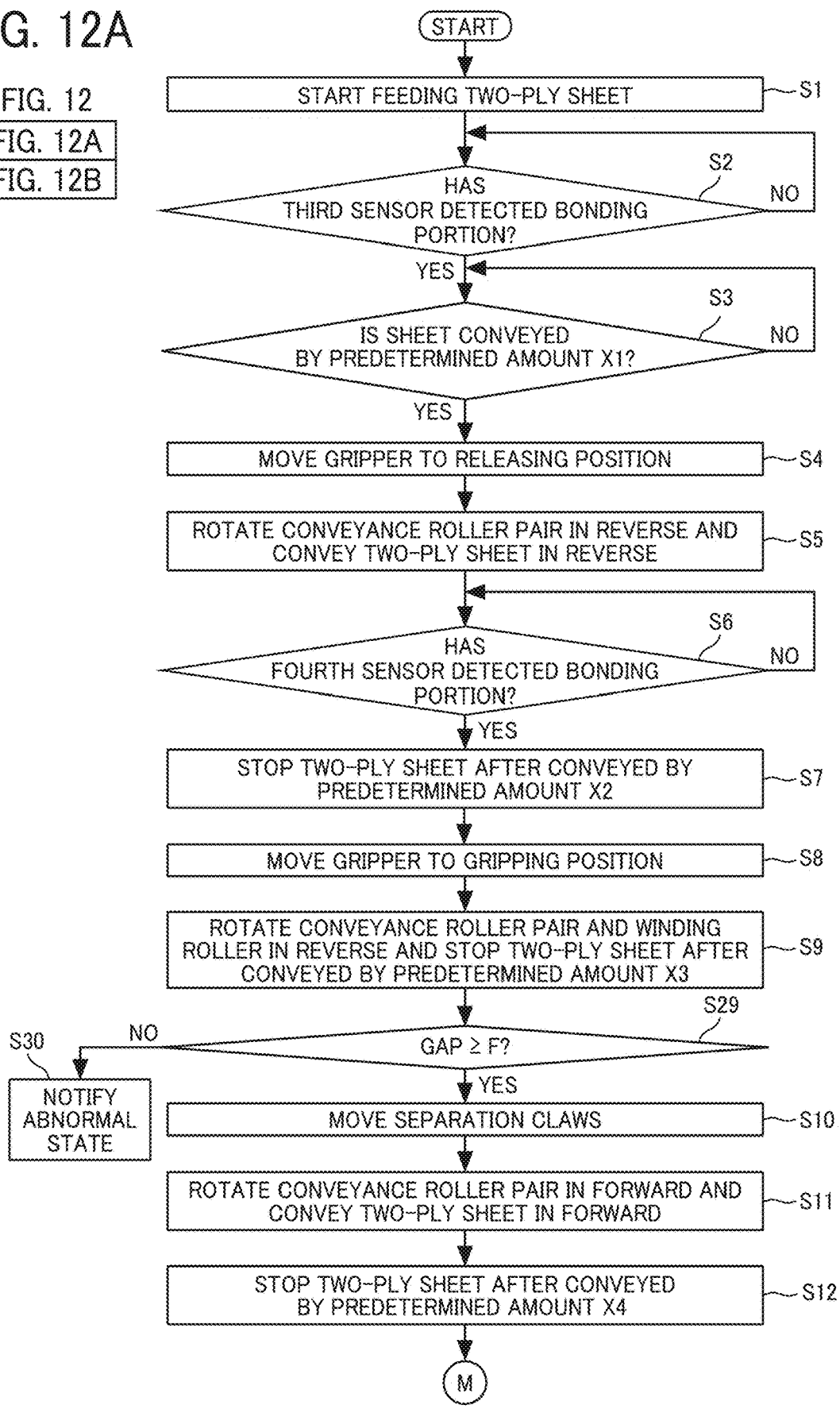
FIGS. 12A and 12B is a flowchart of a flow of a control process executed in the sheet laminator.
Figure 12B:
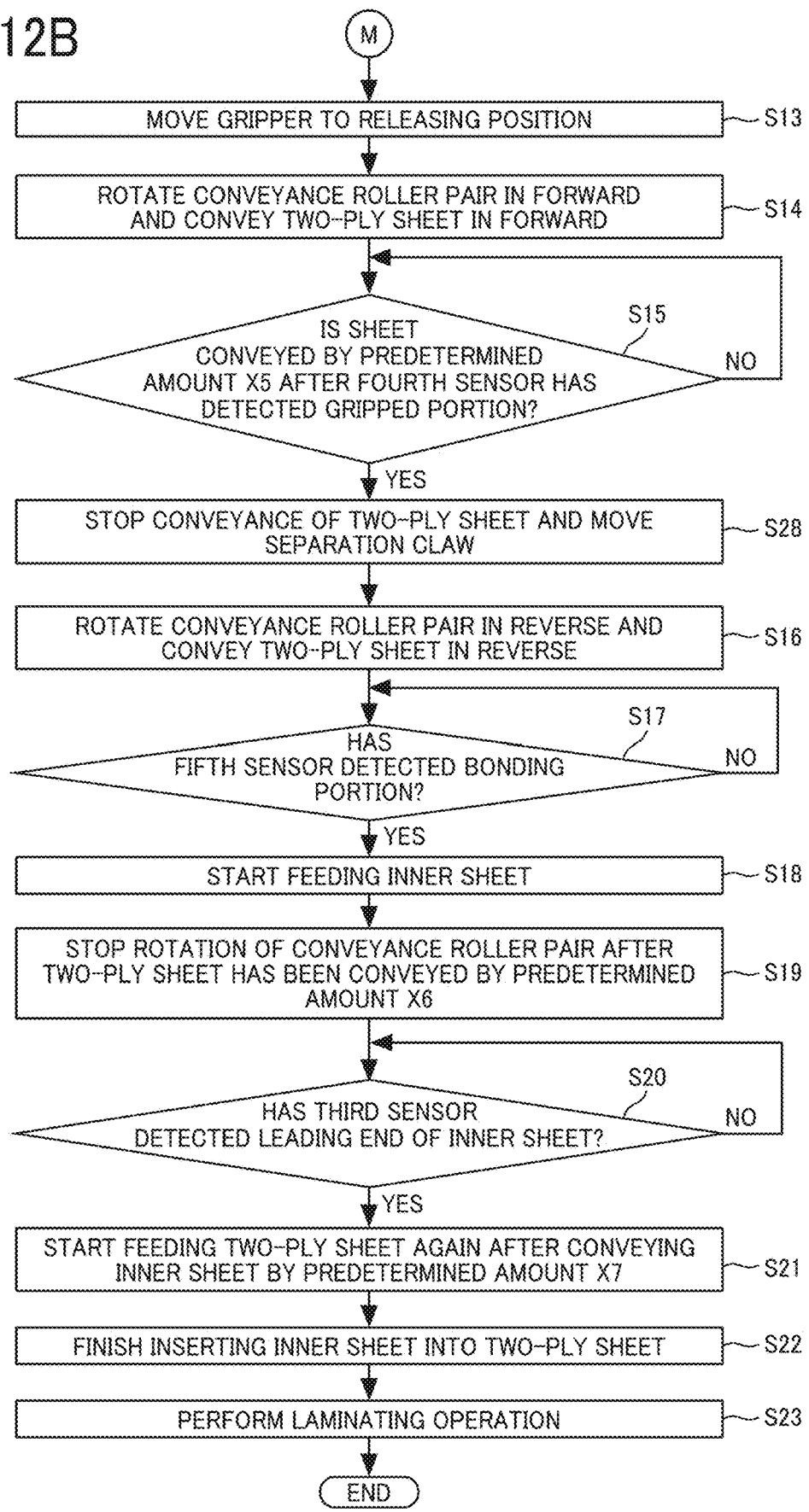

FIG. 12 including FIGS. 12A and 12B is a flowchart of a flow of a control process executed in the sheet laminator 50.

First, the first feed roller 2 and the first conveyance roller pair 4 start feeding the two-ply sheet PJ (i.e., the preceding two-ply sheet PJ1) from the first sheet tray 11 in step S1 of FIG. 12A. Then, as illustrated in FIG. 5A, the second conveyance roller pair 5 conveys the two-ply sheet PJ with the bonding portion A as the leading end of the two-ply sheet PJ in the forward direction that is a direction from the right side to the left side in FIGS. 5A to 5D in the third sheet conveyance passage K3. The forward direction is a direction in which the two-ply sheet PJ travels from the right side to the left side in FIG. 5A.

At this time, the controller 90 causes the moving mechanism 30 to position the gripper 32 at the gripping position.

In other words, the cam 34 rotates to move to a rotational position at which the cam 34 does not press the arm 31. When the gripper 32 is located at the gripping position as described above, the gripper 32 does not interrupt conveyance of the sheet in the third sheet conveyance passage K3. The separation members 16 stand by at the standby positions (i.e., the positions illustrated in FIG. 11A) at which the separation members 16 cannot interrupt conveyance of the sheet in the third sheet conveyance passage K3.

Then, as illustrated in FIG. 5B, the controller 90 determines whether the third sensor 43 has detected the bonding portion A of the two-ply sheet PJ (i.e., the leading end of the two-ply sheet PJ conveyed in the forward direction, in other words, the one end of the two-ply sheet PJ), in step S2 of FIG. 12A. When the third sensor 43 has not detected the bonding portion A of the two-ply sheet PJ (NO in step S2 of FIG. 12A), step S2 is repeated until the third sensor 43 detects the bonding portion A of the two-ply sheet PJ. By contrast, when the third sensor 43 has detected the bonding portion A of the two-ply sheet PJ (YES in step S2 of FIG. 12A), in response to the timing of detection of the bonding portion A of the two-ply sheet PJ by the third sensor 43, the controller 90 causes the third conveyance roller pair 6 to convey the two-ply sheet PJ in the forward direction by a predetermined amount X1 until the gripped portion B of the two-ply sheet PJ (i.e., the trailing end of the two-ply sheet PJ conveyed in the forward direction, in other words, the other end of the two-ply sheet PJ) passes the position of the winding roller 20, in step S3 of FIG. 12A.

As illustrated in FIG. 5C, the controller 90 causes the third conveyance roller pair 6 to temporarily stop conveyance of the two-ply sheet PJ conveyed by the predetermined amount X1 and causes the gripper 32 to move from the gripping position to the releasing position in step S4 of FIG. 12A. In other words, the controller 90 causes the cam 34 to move to a rotational position at which the cam 34 pushes the arm 31. While the cam 34 presses the arm 31, the gripped portion B of the two-ply sheet PJ can be received between the gripper 32 and the receiving portion 20b of the winding roller 20.

Then, as illustrated in FIG. 5D, the controller 90 causes the third conveyance roller pair 6 to rotate in the reverse direction to start conveyance of the two-ply sheet PJ in the reverse direction in step S5 of FIG. 12A. At this time, the fourth sensor 44 detects the gripped portion B of the two-ply sheet PJ (i.e., the other end of the two-ply sheet PJ and the leading end of the two-ply sheet PJ conveyed in the reverse direction).

More specifically, the controller 90 determines whether the fourth sensor 44 detects the gripped portion B of the two-ply sheet PJ, in step S6 of FIG. 12A. When the fourth sensor 44 has not detected the gripped portion B of the two-ply sheet PJ (NO in step S6 of FIG. 12A), step S6 is repeated until the fourth sensor 44 detects the gripped portion B of the two-ply sheet PJ. When the fourth sensor 44 has detected the gripped portion B of the two-ply sheet PJ (YES in step S6 of FIG. 12A), as illustrated in FIG. 6A, the controller 90 causes the third conveyance roller pair 6 to convey the two-ply sheet PJ by a predetermined amount X2, in response to the detection of the gripped portion B of the two-ply sheet PJ, until the gripped portion B of the two-ply sheet PJ reaches the position of the winding roller 20 (i.e., the winding start position W) and then causes the third conveyance roller pair 6 to stop conveyance of the two-ply sheet PJ, in step S7 of FIG. 12A.

After the gripped portion B of the two-ply sheet PJ reaches the winding start position W, as illustrated in FIG. 6B, the controller 90 causes the gripper 32 to move from the releasing position to the gripping position, in step S8 of FIG. 12A. In other words, the controller 90 causes the cam 34 to move to a rotational position at which the cam 34 does not press the arm 31. While the cam 34 is at the rotational position at which the cam 34 does not press the arm 31, as illustrated in FIG. 6B', the end surface of the other end of the two-ply sheet PJ does not contact any member, and the gripped portion B of the two-ply sheet PJ is gripped between the gripper 32 and the receiving portion 20b.

Then, as illustrated in FIG. 6C, the controller 90 causes the winding roller 20 to rotate in the reverse direction (i.e., the counterclockwise direction) with the gripper 32 gripping the two-ply sheet PJ, and then causes the third conveyance roller pair 6 to rotate again in the reverse direction together with the winding roller 20. At this time, as the winding roller 20 rotates, the gap C is formed between the first sheet P1 and the second sheet P2 of the two-ply sheet PJ between the winding roller 20 and the third conveyance roller pair 6, as illustrated in FIG. 6D. As the gap C is formed, the first guide 25 and the second guide 26 limit the warp (slack) of the two-ply sheet PJ in the vicinity of the winding roller 20. As a result, the gap C of the two-ply sheet PJ is intensively formed in proximity to the third conveyance roller pair 6.

As described above, the fourth sensor 44 is disposed downstream from the third conveyance roller pair 6 in the reverse direction and the controller 90 causes the fourth sensor 44 to detect the leading end of the two-ply sheet PJ in the reverse direction. In response to the detection of the leading end of the two-ply sheet PJ by the fourth sensor 44, the controller 90 determines the timing at which the gripper 32 grips the two-ply sheet PJ. Due to such a configuration, the gripped portion B of the two-ply sheet PJ can be accurately conveyed to a desired gripping position regardless of variations in the sheet lengths with respect to the required sheet conveyance amount X2. The size of sheets varies even if the sheets are sold as the same size.

Further, the sheet conveyance amount X2 required from when the fourth sensor 44 detects the leading end of the two-ply sheet PJ conveyed in the reverse direction can be reduced regardless of the sheet length. For this reason, the above-described configuration can reduce variation in the sheet conveyance amount X2 and can accurately convey the gripped portion B of the two-ply sheet PJ to the desired gripping position.

Accordingly, the fourth sensor 44 is preferably disposed at the position in proximity to the winding roller 20.

Further, a description is given of a mechanism that generates the gap C in the two-ply sheet PJ, with reference to FIG. 6C'.

The gap C is generated in the two-ply sheet PJ between the winding roller 20 and the third conveyance roller pair 6 by winding the two-ply sheet PJ around the winding roller 20. The detailed description is given of the mechanism as follows.

The two-ply sheet PJ wound around the winding roller 20 is gripped by the gripper 32, restricting displacement in the two-ply sheet PJ. Due to this configuration, a slip is generated between the first sheet P1 and the second sheet P2 by the amount of the circumferential length of the winding roller 20. Due to the slip, the conveyance amount of the inner sheet (i.e., the first sheet P1) is smaller than the conveyance amount of the outer sheet (i.e., the second sheet P2). As a result, warp (slack) is generated in the inner sheet (i.e., the first sheet P1) between the nip region of the third conveyance roller pair 6 and the winding roller 20. At this time, as the two-ply sheet PJ is wound around the winding roller 20 by one or more rounds, the difference in the winding circumferential length is generated between the inner circumference and the outer circumference by the thickness of the sheet. As a result, the warp (slack) is additionally generated.

More specifically, a distance from the rotary shaft 20a (i.e., the axial center) of the winding roller 20 to the second sheet P2 on the outer side of the winding roller 20 is R+ΔR, where a distance from the rotary shaft 20a (i.e., the axial center) of the winding roller 20 to the first sheet P1 on the inner side of the winding roller 20 is "R" and the thickness of the first sheet P1 on the inner side of the winding roller 20 is "ΔR". Since the radius of the first sheet P1 wound around the inner side of the winding roller 20 and the radius of the second sheet P2 wound around the outer side of the first sheet P1 are different by the thickness ΔR of the first sheet P1 (wound around the inner side of the winding roller 20), a circumferential length difference of 2×ΔR×π is generated between the inner sheet (i.e., the first sheet P1) and the outer sheet (i.e., the second sheet P2) when the two-ply sheet PJ is wound around the winding roller 20 by one round. As a result, where the number of winding the two-ply sheet PJ around the winding roller 20 is M times, the slack of the inner sheet (i.e., the first sheet P1) is generated by the circumferential length difference of 2×ΔR×π×M.

Finally, the warp (slack) is accumulated between the third conveyance roller pair 6 and the winding roller 20, and the gap C corresponding to 2×ΔR×π×M is formed between the first sheet P1 and the second sheet P2.

Then, the controller 90 causes the third conveyance roller pair 6 and the winding roller 20 to rotate in the reverse direction. At the timing at which the third conveyance roller pair 6 has conveyed the two-ply sheet PJ by a predetermined amount X3 since the start of winding of the two-ply sheet PJ by the winding roller 20, the controller 90 causes the third conveyance roller pair 6 to stop conveyance of the two-ply sheet PJ and the winding roller 20 to stop winding the two-ply sheet PJ, as illustrated in FIG. 7A, in step S9 of FIG. 12A. While the conveyance and winding of the two-ply sheet PJ are stopped, the two-ply sheet PJ is wound around the winding roller 20 one or more times, and the gap C in the two-ply sheet PJ (i.e., the distance between the first sheet P1 and the second sheet P2 in the vertical direction) is sufficiently widened if the two-ply sheet PJ is normally separated.

When the gap C is sufficiently widened, the controller 90 determines whether the sixth sensor 46 detects that the gap C equal to or larger than a predetermined distance F is formed in the two-ply sheet PJ, in step S29 of FIG. 12A.

As a result, when the controller 90 determines that the gap C is the sufficiently large gap equal to or greater than the predetermined distance F, the controller 90 then determines that the subsequent sheet separating operations of the separation members 16 do not cause any failure and causes the separation members 16 to be inserted into the gap C sufficiently widened in the two-ply sheet PJ, as illustrated in FIG. 7B, in step S10 of FIG. 12A. In other words, as illustrated in FIGS. 10 and 11A, each of the separation members 16 in pair is moved from the standby position to the separation position.

Then, as illustrated in FIG. 7C, while the separation members 16 are inserted in the gap C, the controller 90 causes the third conveyance roller pair 6 and the winding roller 20 to start rotating in the forward direction (i.e., in the clockwise direction), in step S11 of FIG. 12A. In other words, as illustrated in FIGS. 11A, 11B, and 11C, the separation members 16 that are inserted in the gap C of the two-ply sheet PJ relatively move from the one end (i.e., the bonding portion A) to the other end (i.e., the gripped portion B) with respect to the two-ply sheet PJ. The above-described relative movement in the present embodiment is achieved by moving the two-ply sheet PJ itself in a direction indicated by arrow in FIGS. 11A, 11B, and 11C, without changing the positions of the separation members 16 in the sheet conveyance direction.

When the controller 90 determines that the sixth sensor 46 has detected the abnormal condition, in other words, when the controller 90 determines that the gap C in the two-ply sheet PJ is not the sufficiently large gap equal to or greater than the predetermined distance F (NO in step S29 of FIG. 12A), the controller 90 determines that the subsequent sheet separating operations by the separation members 16 cause various kinds of failures. For this reason, the controller 90 does not cause the separation members 16 to move from the standby positions to the separation positions. At this time, the controller 90 causes the operation display panel 49 (see FIG. 1) to notify a user or users that the occurrence of the abnormal condition stops the sheet separating operation of the two-ply sheet PJ and the sheet inserting operation of the inner sheet PM, in step S30 of FIG. 12A.

After step S11, as illustrated in FIG. 8A, the controller 90 causes the third conveyance roller pair 6 and the winding roller 20 to stop rotating in the forward direction after the third conveyance roller pair 6 has conveyed the two-ply sheet PJ in the forward direction by a predetermined amount X4, in step S12 of FIG. 12A. At this time, the gripped portion B of the two-ply sheet PJ is positioned on the third sheet conveyance passage K3 (i.e., at the winding start position W illustrated in FIG. 6B), which is a state in which the gripper 32 may release the gripped portion B. In addition, as illustrated in FIG. 11C, the controller 90 causes the separation members 16 to stop in proximity to the other end of the two-ply sheet PJ after the separation members 16 are inserted into the gap C of the two-ply sheet PJ and relatively move to the other end (i.e., the gripped portion B) of the two-ply sheet PJ with respect to the two-ply sheet PJ.

While the separation members 16 are stopped in proximity to the other end of the two-ply sheet PJ, the controller 90 causes the gripper 32 to move from the gripping position to the releasing position in step S13 of FIG. 12B. In other words, the controller 90 causes the cam 34 to move to the rotational position at which the cam 34 does not press the arm 31. By so doing, the gripper 32 releases the gripping of the two-ply sheet PJ. In the present embodiment, the cam 34 in the moving mechanism 30 moves to release the gripping of the two-ply sheet PJ by the gripper 32. However, when the pulling force by conveyance of the two-ply sheet PJ by the third conveyance roller pair 6 is greater than the gripping force of the gripper 32 to grip the two-ply sheet PJ, the gripping of the two-ply sheet PJ by the gripper 32 can be released by pulling the two-ply sheet PJ from the gripper 32 due to conveyance of the two-ply sheet PJ by the third conveyance roller pair 6 without moving the cam 34 in the moving mechanism 30.

After step S13, as illustrated in FIG. 8B, the controller 90 causes the third conveyance roller pair 6 to rotates in the forward direction again to start conveyance of the two-ply sheet PJ in the forward direction, in step S14 of FIG. 12B. In addition, after the gripped portion B of the two-ply sheet PJ (i.e., the other end of the two-ply sheet PJ and the trailing end of the two-ply sheet PJ in the forward direction) passes over the branching point between the third sheet conveyance passage K3 and each of the first branched sheet conveyance passage K4 and the second branched sheet conveyance passage K5, the controller 90 causes the gripper 32 to move from the releasing position to the gripping position. Further, at this time, the fourth sensor 44 detects the gripped portion B of the two-ply sheet PJ (i.e., the other end of the two-ply sheet PJ and the trailing end of the two-ply sheet PJ conveyed in the forward direction). After the fourth sensor 44 has detected the trailing end of the two-ply sheet PJ in the forward direction, the controller 90 determines whether the third conveyance roller pair 6 conveys the two-ply sheet PJ by a predetermined amount X5 in response to the timing of the detection of the trailing end of the two-two-ply sheet PJ by the fourth sensor 44, in step S15 of FIG. 12B. When the third conveyance roller pair 6 does not convey the two-ply sheet PJ by the predetermined amount X5 after the fourth sensor 44 has detected the gripped portion B of the two-ply sheet PJ (NO in step S15 of FIG. 12B), step S15 is repeated until the third conveyance roller pair 6 conveys the two-ply sheet PJ by the predetermined amount X5 after the fourth sensor 44 has detected the gripped portion B of the two-ply sheet PJ. By contrast, when the third conveyance roller pair 6 conveys the two-ply sheet PJ by the predetermined amount X5 after the fourth sensor 44 has detected the gripped portion B of the two-ply sheet PJ (YES in step S15 of FIG. 12B), as illustrated in FIG. 11D, the controller 90 causes the third conveyance roller pair 6 to stop conveying the two-ply sheet PJ and causes the separation members 16 to move in the width direction of the two-ply sheet PJ, in step S28 of FIG. 12B. As a result, as illustrated in FIG. 8B, the trailing ends of the first sheet P1 and the second sheet P2 of the two-ply sheet PJ conveyed in the forward direction are separated and largely opened (see FIG. 11D). At this time, the controller 90 starts to perform the sheet separating operation on the two-ply sheet PJ.

Then, as illustrated in FIG. 8C, the controller 90 causes the third conveyance roller pair 6 to rotate in the reverse direction to start conveyance of the two-ply sheet PJ in the reverse direction, in step S16 of FIG. 12B. At this time, since the separation members 16 are disposed at the switching positions at which the separation members 16 block entrance of the two-ply sheet PJ moving to the third sheet conveyance passage K3 (i.e., the position illustrated in FIG. 11D), the first sheet P1 and the second sheet P2 separated from each other are guided to the first branched sheet conveyance passage K4 and the second branched sheet conveyance passage K5, respectively, as illustrated in FIG. 8C. At this time, the fifth sensor 45 (see FIG. 1) detects the bonding portion A of the two-ply sheet PJ (i.e., the one end of the two-ply sheet PJ and the trailing end of the two-ply sheet PJ conveyed in the reverse direction). Subsequently, the controller 90 determines whether the fifth sensor 45 (see FIG. 1) that functions as a sheet detector or sheet sensor has detected the trailing end of the two-ply sheet PJ conveyed in the reverse direction (i.e., the bonding portion A), in step S17 of FIG. 12B. In response to detection of the trailing end of the two-ply sheet PJ in the reverse direction by the fifth sensor 45 (see FIG. 1), the controller 90 causes the second feed roller 3 to start feeding the inner sheet PM from the second sheet tray 12, in step S18 of FIG. 12B. The timing at which the second feed roller 3 starts to feed the inner sheet PM is not limited to the above-described timing. It is preferable to set the timing to reduce the time to perform the sheet separating operation and the sheet inserting operation.

Subsequently, as illustrated in FIG. 9A, in response to the timing of detection of the trailing end of the two-ply sheet PJ in the reverse direction by the fifth sensor 45 (see FIG. 1), the controller 90 causes the third conveyance roller pair 6 to rotate to convey the two-ply sheet PJ by a predetermined amount X6, and stop the conveyance of the two-ply sheet PJ when the two-ply sheet PJ has been conveyed by the predetermined amount X6, in step S19 of FIG. 12B. When the third conveyance roller pair 6 conveys the two-ply sheet PJ by the predetermined amount X6, the bonding portion A of the two-ply sheet PJ is in the nip region of the third conveyance roller pair 6 or at a position slightly leftward from the nip region of the third conveyance roller pair 6. In other words, the one end of the two-ply sheet PJ is nipped by the third conveyance roller pair 6. With this state, the sheet separating operation of the two-ply sheet PJ is completed.

Further, before completion of the sheet separating operation of the two-ply sheet PJ, the controller 90 has already started feeding the inner sheet PM from the second sheet tray 12. Since the inner sheet PM is fed from the second sheet tray 12, as illustrated in FIG. 9A, when the sheet separating operation on the two-ply sheet PJ is completed, the leading end of the inner sheet PM (i.e., at one end of the inner sheet PM in the forward direction) has approached the position at which the inner sheet PM is inserted between the first sheet P1 and the second sheet P2 of the two-ply sheet PJ.

On the other hand, the third sensor 43 detects the leading end of the inner sheet PM (i.e., at the one end of the inner sheet PM in the forward direction). In addition, as illustrated in FIG. 9B, in response to the detection of the leading end of the inner sheet PM, the separation members 16 move to the respective standby positions at the timing at which the separation members 16 do not interrupt conveyance of the inner sheet PM.

Figure 11E:
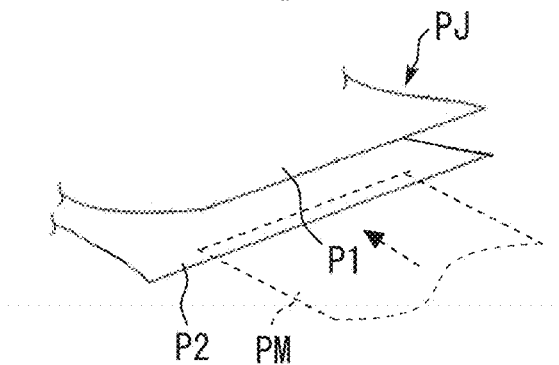

Further, as illustrated in FIGS. 9C and 11E, the controller 90 determines whether the third sensor 43 has detected the leading end of the inner sheet PM in the forward direction, in step S20 of FIG. 12B. When the third sensor 43 has not detected the leading end of the inner sheet PM in the forward direction (NO in step S20 of FIG. 12B), step S20 is repeated until the third sensor 43 has detected the leading end of the inner sheet PM in the forward direction. By contrast, when the third sensor 43 has detected the leading end of the inner sheet PM in the forward direction (YES in step S20 of FIG. 12B), in response to the timing of detection of the leading end of the inner sheet PM in the forward direction by the third sensor 43, the controller 90 causes the second conveyance roller pair 5 to convey the inner sheet PM by a predetermined amount X7. Then, the controller 90 causes the third conveyance roller pair 6 to start conveying the two-ply sheet PJ in the forward direction again, in step S21 of FIG. 12B. At this time, the inner sheet PM is accurately nipped at a desired position between the first sheet P1 and the second sheet P2 of the two-ply sheet PJ.

As described above, the controller 90 finishes the sheet inserting operation to insert the inner sheet PM in the two-ply sheet PJ, in other words, between the first sheet P1 and the second sheet P2 of the two-ply sheet PJ (step S22 of FIG. 12B).

The controller 90 then causes the third conveyance roller pair 6 to convey the two-ply sheet PJ with the inner sheet PM being inserted after the sheet separating operation, so that the two-ply sheet PJ passes through the fourth sheet conveyance passage K6 opened to conveyance of the two-ply sheet PJ by the switching claw 17 to be conveyed to the sheet lamination device 51 by the third conveyance roller pair 6.

Then, the sheet lamination device 51 starts to perform the sheet laminating operation on the two-ply sheet PJ in which the inner sheet PM is inserted (step S23 of FIG. 12B). After the sheet laminating operation has been performed on the two-ply sheet PJ' (i.e., the two-ply sheet PJ in which the inner sheet PM has been inserted), the two-ply sheet PJ' is ejected by the first ejection roller pair 7 through an ejection port Z to be stacked on the ejection tray 13 (see FIG. 1, for example). Then, the process of the flowchart ends.

A description is given of the configuration and operations of the sheet laminator 50 serving as a sheet processing apparatus according to the present embodiment.

Referring to FIG. 1, the sheet laminator 50 (serving as a sheet processing apparatus) according to the present embodiment includes the multifeed detection sensor 61 in the sheet conveyance passage (i.e., the first sheet conveyance passage K1). The multifeed detection sensor 61 serving as a multifeed detector or sensor detects whether the two-ply sheets PJ as sheets are fed from the sheet feeder (e.g., the first sheet tray 11 and the first feed roller 2).

Specifically, the multifeed detection sensor 61 (serving as a multifeed detector or sensor) is disposed in proximity to the sheet feeder (e.g., the first sheet tray 11 or the first feed roller 2), in other words, at the position of the first conveyance roller pair 4. The multifeed detection sensor 61 is an optical sensor (e.g., a reflective photosensor) to detect the sheet (e.g., the two-ply sheet PJ) passing the position of the multifeed detection sensor 61.

The multifeed detection sensor 61 serving as a multifeed detector or sensor detects the leading end of the two-ply sheet PJ (sheet) passing the position of the multifeed detection sensor 61. Then, if the multifeed detection sensor 61 does not detect the trailing end of the two-ply sheet PJ after the predetermined time Tx (i.e., the predetermined time according to the size of the two-ply sheet PJ in the sheet conveyance direction) has elapsed, the controller 90 determines that the two-ply sheet PJ is multifed with another two-ply sheet PJ.

When the two-ply sheet PJ is multifed with, for example, a subsequent two-ply sheet PJ, in many cases, the two-ply sheet PJ and the subsequent two-ply sheet PJ are displaced from each other in the sheet conveyance direction, in other words, the two-ply sheet PJ and the subsequent two-ply sheet PJ are conveyed while maintaining the predetermined amount of displacement of the two-ply sheet PJ in the sheet conveyance direction. In such a case, the two-ply sheet PJ having the displacement is longer in the sheet conveyance direction than the two-ply sheet PJ that is successfully conveyed without multiple feed. For this reason, when the time from the detection of the leading end of the two-ply sheet PJ to the detection of the trailing end of the two-ply sheet PJ by the multifeed detection sensor 61 exceeds the predetermined time Tx (i.e., the time of detection of the leading and trailing ends of the two-ply sheet PJ that is successfully conveyed), the controller 90 determines that the two-ply sheet PJ is multifed with another two-ply sheet PJ.

The above-described "predetermined time Tx" is a value (Tx=G/V+α) obtained by adding a margin α (i.e., a value in consideration of a dimensional error or an assembly error of a related component or a sheet) to a value obtained by dividing the size G of the sheet in the sheet conveyance direction by the conveying speed V. The size G of the sheet in the sheet conveyance direction is obtained based on the size information of the two-ply sheet PJ input by, e.g., a user to the operation display panel 49 (see FIG. 1).

In other words, the multifeed detection sensor 61 serving as a multifeed detector or sensor detects the length of the two-ply sheet PJ in the sheet conveyance direction from the leading end to the trailing end of the two-ply sheet PJ.

In the present embodiment, the multifeed detection sensor 61 is provided separate from the first sensor 41 that detects no sheet feeding (for example, paper jam) of the two-ply sheet PJ from the first sheet tray 11. However, the first sensor 41 may serve as a multifeed detector or sensor instead of the multifeed detection sensor 61.

Further, in the present embodiment, the multifeed detection sensor 61 indirectly detects the length from the leading end of the two-ply sheet PJ to the trailing end of the two-ply sheet PJ (i.e., the length of the two-ply sheet PJ in the sheet conveyance direction). By so doing, the controller 90 determines whether the two-ply sheet PJ is fed with another two-ply sheet PJ. However, the multifeed detector (or the multifeed sensor) is not limited to the above-described configuration. For example, a distance measurement sensor or a thickness detection sensor may be employed as a multifeed detector to detect the thickness of the two-ply sheet PJ, so that the controller 90 can grasp whether the two-ply sheet PJ is fed with another two-ply sheet PJ.

With reference to FIG. 1, the sheet laminator 50 serving as a sheet processing apparatus is provided with a sheet detector or sensor disposed downstream from the multifeed detection sensor 61 (serving as a multifeed detector or sensor) along the sheet conveyance passage in the sheet conveyance direction. The sheet detector (sheet sensor) included in the sheet laminator 50 may include the third sensor 43, the fourth sensor 44, the fifth sensor 45, the seventh sensor 47, and the eighth sensor 48, each of which detects the two-ply sheet PJ (sheet) passing the position of the sheet sensor.

When the multifeed detection sensor 61 (serving as a multifeed detector or sensor) has not detected multifeed of the two-ply sheet PJ (sheet) and if the third sensor 43, the fourth sensor 44, the fifth sensor 45, the sixth sensor 46, the seventh sensor 47, and the eighth sensor 48, each serving as a sheet detector or sensor disposed downstream from the multifeed detection sensor 61 in the sheet conveyance direction do not detect the trailing end of the two-ply sheet PJ after a first set time T1 has elapsed from the time at which the third sensor 43, the fourth sensor 44, the fifth sensor 45, the sixth sensor 46, the seventh sensor 47, and the eighth sensor 48 (sheet detector) detects the leading end of the two-ply sheet PJ, the controller 90 determines that conveyance of the two-ply sheet PJ is stopped (jammed) unintentionally and causes the sheet laminator 50 to stop the operation, in other words, to stop conveyance of the two-ply sheet PJ). The first set time T1 is a predetermined time or a time determined in advance in accordance with the size of the two-ply sheet PJ in the sheet conveyance direction. For example, when the multifeed detection sensor 61 has not detected multiple feed and the time to detect the leading and trailing ends of the two-ply sheet PJ has exceeded the first set time T1, the controller 90 determines that the two-ply sheet PJ is jammed (stopped) at the position of the third sensor 43 and causes the sheet laminator 50 to stop the operation. Then, the controller 90 causes the operation display panel 49 to display the occurrence of the jam, the jam occurrence location, and the jam handling procedure. As a result, the user opens a door 56 (see FIG. 1) and removes the jammed two-ply sheet PJ with the sheet conveyance passage of the sheet laminator 50 being exposed.

The above-described "first set time T1" is a value (Tx=G/V+α) obtained by adding the margin α (i.e., the value in consideration of a dimensional error or an assembly error of a related component or a sheet) to a value obtained by dividing the size G of the sheet in the sheet conveyance direction by the conveying speed V. The size G of the sheet in the sheet conveyance direction is obtained based on the information of the two-ply sheet PJ input by, e.g., a user to the operation display panel 49 (see FIG. 1).

In other words, the sheet detector or sensor (i.e., the third sensor 43, the fourth sensor 44, the fifth sensor 45, the sixth sensor 46, the seventh sensor 47, and the eighth sensor 48) detects the length of the two-ply sheet PJ in the sheet conveyance direction from the leading end to the trailing end of the two-ply sheet PJ.

When the multifeed of the two-ply sheets PJ is not detected and the detection time of the leading and trailing ends of the sheet by the sheet detector or sensor does not exceed the first set time T1, the controller 90 continues the sheet separating operation, the sheet inserting operation, and the sheet laminating operation. As a result, the two-ply sheet PJ is also continuously conveyed.

On the other hand, when the multifeed detection sensor 61 (serving as a multifeed detector or sensor) has detected multifeed of the two-ply sheets PJ (sheets) and if the third sensor 43, the fourth sensor 44, the fifth sensor 45, the sixth sensor 46, the seventh sensor 47, and the eighth sensor 48 (each serving as a sheet detector or sensor) that are disposed downstream from the multifeed detection sensor 61 in the sheet conveyance direction do not detect the trailing end of the two-ply sheet PJ after the second set time T2 (i.e., the time that is set longer than the first set time T1) has elapsed from the time at which the sheet detector (sheet sensor) detects the leading end of the two-ply sheet PJ, the controller 90 determines that conveyance of the two-ply sheet PJ (i.e., the multifed sheet that is intended to be conveyed to the purge tray 55) is stopped (jammed) unintentionally and causes the sheet laminator 50 to stop the operation (i.e., the conveyance of the two-ply sheets PJ).

For example, when the multifeed detection sensor 61 had detected multiple feed and the time to detect the leading and trailing ends of the multifed two-ply sheet PJ exceeds the second set time T2 (in other words, greater than the first set time T1), the controller 90 determines that the multifed two-ply sheet PJ is jammed (stopped) at the position of the third sensor 43 and causes the sheet laminator 50 to stop the operation. Then, the controller 90 causes the operation display panel 49 to display the occurrence of the jam, the jam occurrence location, and the jam handling procedure. As a result, the user opens a door 56 (see FIG. 1) and removes the jammed (multifed) two-ply sheet PJ with the sheet conveyance passage of the sheet laminator 50 being exposed.

The above-described "second set time T1" is longer than the above-described "first set time T1" and is shorter than twice the "first set time T1".

The sheet detector or sensor (i.e., the third sensor 43, the fourth sensor 44, the fifth sensor 45, the sixth sensor 46, the seventh sensor 47, and the eighth sensor 48) detects, in fact, the length of the two-ply sheet PJ in the sheet conveyance direction from the leading end to the trailing end of the two-ply sheet PJ.

As described above, in the present embodiment, when the two-ply sheet PJ is multifed with another two-ply sheet PJ (or a subsequent two-ply sheet PJ), the criteria for determining whether the sheet detector (sheet sensor) detects paper jam in the sheet conveyance passage is eased (in other words, the set time T is increased) when compared with the case of no multiple feed.

The reason why the criteria for determining whether the sheet detector (sheet sensor) detects paper jam in the sheet conveyance passage is eased is that the multifed two-ply sheet PJ is longer in the length in the sheet conveyance direction than the two-ply sheet PJ that is fed with no multiple feed and that the multifed two-ply sheet PJ is conveyed with the longer length.

In the present embodiment, when the multifeed detection sensor 61 (serving as a multifeed detector or sensor) has detected multifeed of the two-ply sheets PJ (sheets) and if the third sensor 43, the fourth sensor 44, the fifth sensor 45, the sixth sensor 46, the seventh sensor 47, and the eighth sensor 48 (each serving as a sheet detector or sensor) that are disposed downstream from the multifeed detection sensor 61 in the sheet conveyance direction detect the trailing end of the two-ply sheet PJ after before the second set time T2 elapses from the time at which the third sensor 43, the fourth sensor 44, the fifth sensor 45, the sixth sensor 46, the seventh sensor 47, and the eighth sensor 48 (sheet detector or sensor) detect the leading end of the two-ply sheet PJ, the controller 90 determines that the two-ply sheet PJ (i.e., the multifed sheet that is intended to be conveyed to the purge tray 55) is conveyed normally and causes the multifed two-ply sheet PJ to be conveyed toward the purge tray 55 (serving as a purge unit) without stopping the operation of the sheet laminator 50 (i.e., the conveyance of the two-ply sheets PJ).

At this time, the controller 90 causes the operation display panel 49 to display the message to notify the user that the predetermined operation such as the sheet separating operation, the sheet inserting operation, and the sheet laminating operation is not performed due to multiple feed, that the multifed two-ply sheet PJ is ejected to the purge tray 55, and the procedure of removing the two-ply sheet PJ from the purge tray 55.

As a result, the user can easily remove the unprocessed two-ply sheets PJ (in other words, the multifed two-ply sheet PJ) from the purge tray 55 without opening the door 56 (see FIG. 1) and exposing the sheet conveyance passage of the sheet laminator 50.

As described above, in the present embodiment, when the two-ply sheet PJ is multifed with another two-ply sheet PJ (or a subsequent two-ply sheet PJ), the criteria for determining detection of paper jam (e.g., the set time T) is changed from the time when the two-ply sheet PJ is not multifed. Accordingly, this configuration of the sheet laminator 50 according to the present embodiment can prevent the failure in which the controller 90 detects that the paper jam has occurred in the sheet conveyance passage (i.e., the conveyance of the two-ply sheet PJ is stopped) without ejecting the multifed two-ply sheet PJ to the purge tray 55 even when the multifed two-ply sheet PJ can be conveyed and causes the sheet laminator 50 to stop the operation. Due to such a configuration, the operability of the sheet laminator 50 in removal of the multifed two-ply sheet PJ from the sheet laminator 50 is enhanced.

The sheet laminator 50 according to the present embodiment can adjust the above-described "second set time T2" by operating the operation display panel 49 by an operator such as a user or a service representative.

To be more specific, the operator operates the operation display panel 49 to open the adjustment screen for the "second set time T2" and finely adjust the "second set time T2" to any value.

As a result, when the accuracy of paper jam detection of the multifed two-ply sheet PJ is relatively low in practical use, the "second set time T2" can be finely adjusted to increase the accuracy.

In the present embodiment, the first sensor 41 is a sheet detector or sensor disposed in proximity to the sheet feeder (e.g., the first sheet tray 11 or the first feed roller 2) to detect the sheet passing the position of the first sensor 41. In the present embodiment, the "second set time T2" may be set based on the time from when the first sensor 41 detects the leading end of the two-ply sheet PJ to when the first sensor 41 detects the trailing end of the two-ply sheet PJ, in other words, the time from detection of the leading end of the two-ply sheet PJ with the first sensor 41 to detection of the trailing end of the two-ply sheet PJ with the first sensor 41.

To be more specific, the first sensor 41 detects the length Q in the sheet conveyance direction of the two-ply sheet PJ, so that the "second set time T2" for when the multifeed detection sensor 61 detects multiple feed may be set to the time corresponding to "the length Q in the sheet conveyance direction+the predetermined amount NC". The "predetermined amount NC" may be a fixed value in consideration of an error such as slip, sensor attachment position, or shape of a conveyance guide plate regardless of the sheet size.

Figure 14:
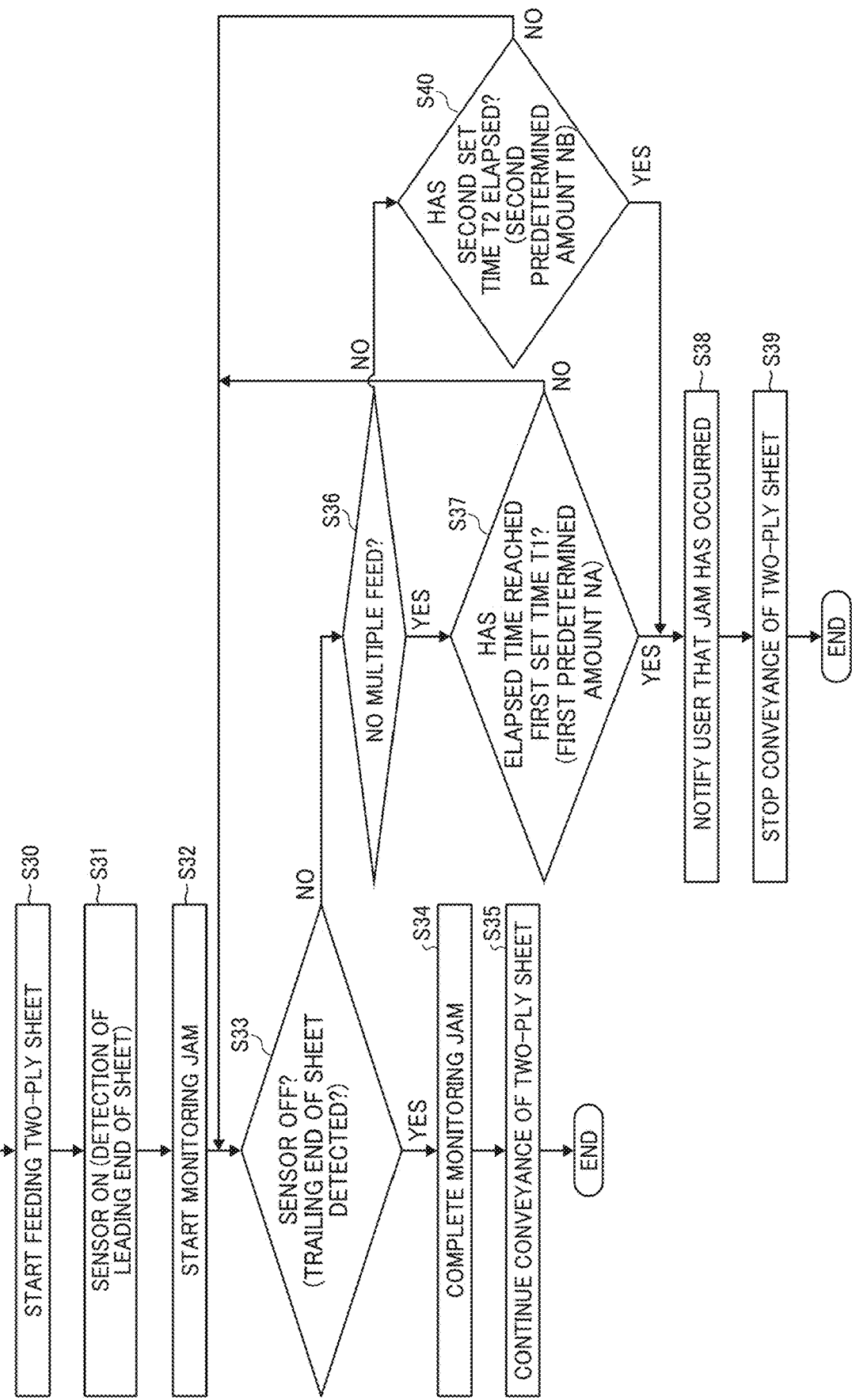
FIG. 14 is a flowchart illustrating of a flow of a control process related to detection of multiple feed of the two-ply sheet.

A description is given of the flow of the control process related to detection of multiple feed and paper jam of the two-ply sheet PJ, with reference to FIG. 14.

FIG. 14 is a flowchart illustrating of a flow of a control process related to a multiple feeding detection of the two-ply sheet.

As illustrated in FIG. 14, the controller 90 starts feeding the two-ply sheet PJ from the first sheet tray 11 serving as a sheet feeder (step S30). Then, the sheet detectors or sensors (i.e., the first sensor 41, the second sensor 42, the third sensor 43, the fourth sensor 44, the fifth sensor 45, the sixth sensor 46, the seventh sensor 47, and the eighth sensor 48) disposed respective positions on the sheet conveyance passage detect the leading end of the two-ply sheet PJ (i.e., the leading end of the sheet) (step S31). Then, the controller 90 starts monitoring paper jam at the position, in other words, the controller 90 determines whether the two-ply sheet PJ is jammed (step S32). To be more specific, the controller 90 starts measuring the time from detection of the leading end of the sheet (or the length of the two-ply sheet PJ in the sheet conveyance direction) with the sheet detectors or sensors.

Then, the controller 90 determines whether the sheet detectors or sensors detect the trailing end of the two-ply sheet PJ (i.e., the trailing end of the sheet) (step S33). When the trailing end of the two-ply sheet PJ is not detected (NO in step S33), the controller 90 causes the multifeed detection sensor 61 disposed upstream from the sheet detector or sensor to detect whether the two-ply sheet PJ is multifed, in other words, whether there is multiple feed of the two-ply sheet PJ (step S36).

As a result, when the multiple feed detection sensor 61 has not detected any multiple feed (YES in step S36), the controller 90 determines whether the elapsed time (or the length of the two-ply sheet PJ in the sheet conveyance direction) from step S32 has reached the first set time T1, in other words, the first predetermined amount NA (step S37). As a result, when the elapsed time has not reached the first set time T1 (or the first predetermined amount NA) (NO in step S37), the controller 90 determines that no paper jam has occurred (in other words, the trailing end of the two-ply sheet PJ is detected) (YES in step S33), and then complete monitoring the paper jam (step S34). Then, the controller 90 causes the sheet laminator 50 to continue the conveyance of the two-ply sheet PJ (step S35). On the other hand, when the elapsed time has reached the first set time T1 (or the first predetermined amount NA) (YES in step S37), the controller 90 determines that the paper jam has occurred and causes the operation display panel 49 to notify the user that the paper jam has occurred (step S38). Then, the controller 90 causes the sheet laminator 50 to stop the conveyance of the two-ply sheets PJ, in other words, the operation of the sheet laminator 50 (step S39).

On the other hand, when the multiple feed detection sensor 61 has detected the multiple feed (NO in step S36), the controller 90 determines whether the elapsed time (or the length of the two-ply sheet PJ in the sheet conveyance direction) from step S32 has reached the second set time T2 (or the second predetermined amount NB) (step S40). As a result, when the elapsed time (or the length of the two-ply sheet PJ in the sheet conveyance direction) has not reached the second set time T2 (or the second predetermined amount NB) (NO in step S40), the controller 90 determines that no paper jam has occurred on the multifed two-ply sheet PJ (YES in step S33), and then complete monitoring the paper jam (step S34). Then, the controller 90 causes the sheet laminator 50 to continue the conveyance of the two-ply sheet PJ toward the purge tray 55 (step S35). On the other hand, when the elapsed time (or the length of the two-ply sheet PJ in the sheet conveyance direction) has reached the second set time T2 (or the second predetermined amount NB) (YES in step S40), the controller 90, the controller 90 determines that the paper jam has occurred on the two-ply sheet PJ and causes the operation display panel 49 to notify the user that the paper jam has occurred (step S38). Then, the controller 90 causes the sheet laminator 50 to stop the conveyance of the multifed two-ply sheets PJ, in other words, the operation of the sheet laminator 50 (step S39).

Modification 1

Figure 15:
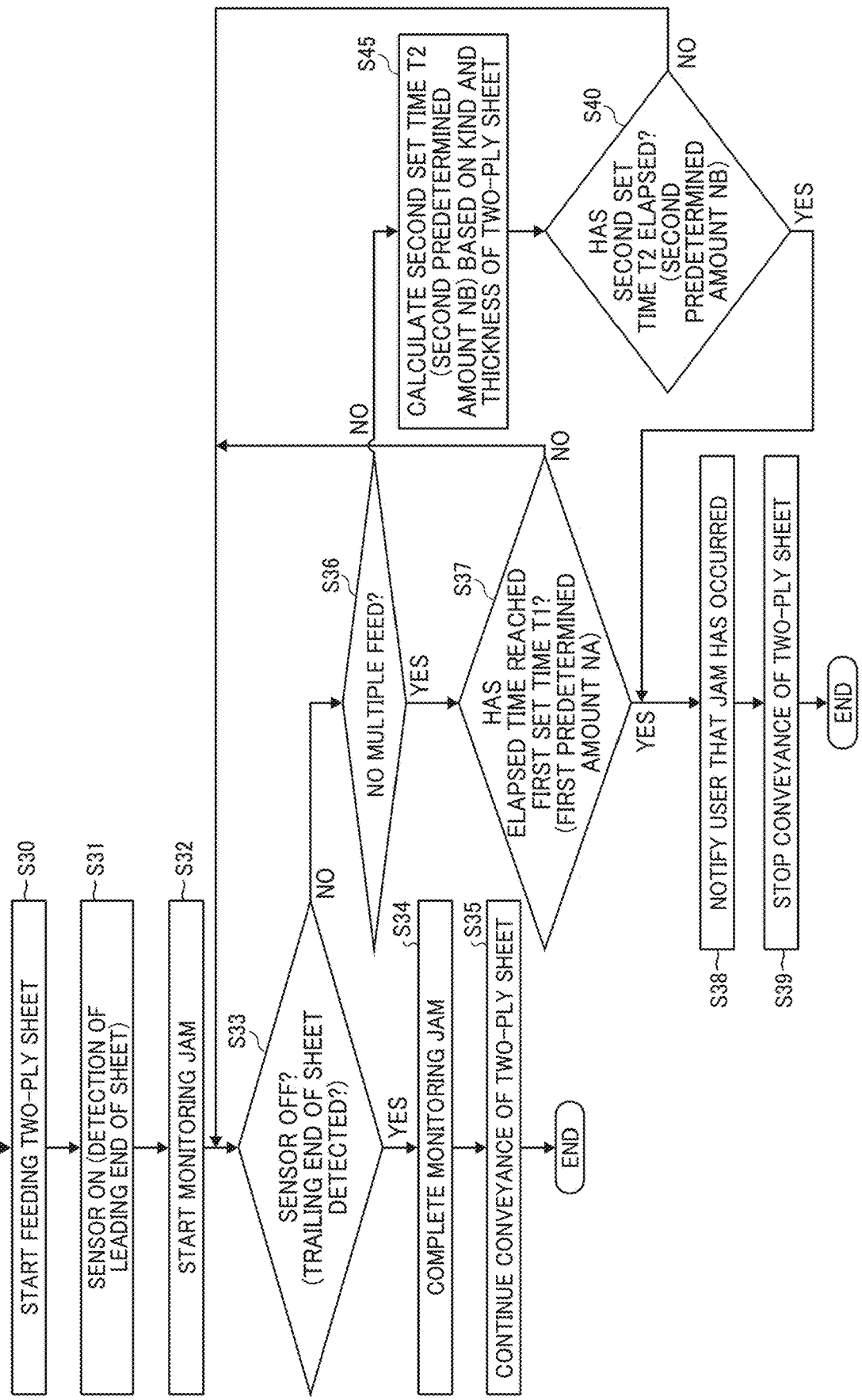
FIG. 15 is a flowchart illustrating a flow of a control process related to the multiple feeding detection of the two-ply sheet, according to Modification 1 of an embodiment of the present disclosure.
Figures 16, 17:
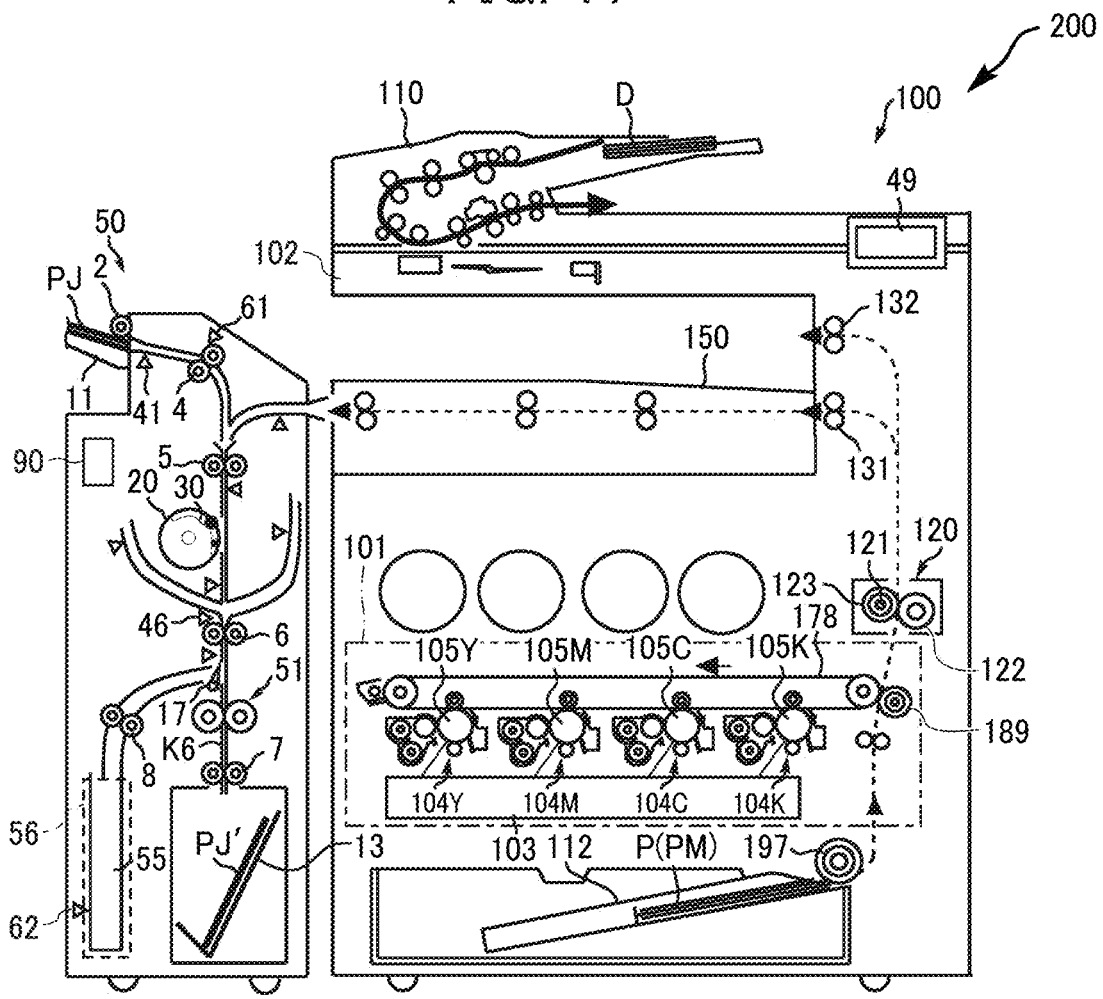
FIG. 16 is a table illustrating the relation of sheet size, sheet thickness, and setting value of jam determination at multiple feeding.
FIG. 17 is a diagram illustrating an image forming system according to Modification 2 of an embodiment of the present disclosure.

A description is given of the sheet laminator 50 according to Modification 1 of an embodiment of the present disclosure, with reference to FIGS. 15 and 16.

FIG. 15 is a flowchart illustrating of a flow of a control process related to detection of multiple feed of the two-ply sheet, according to Modification 1 of an embodiment of the present disclosure.

FIG. 16 is a table illustrating the relation of sheet size, sheet thickness, and setting value of jam determination at multiple feed.

Referring to FIGS. 15 and 16, the sheet laminator 50 (serving as a sheet processing apparatus) according to Modification 1 of an embodiment of the present disclosure is to change the "second set time T2" at occurrence of multiple feed, based on at least one of the thickness or kind of the two-ply sheet PJ (sheet) fed from the sheet feeder (i.e., the first sheet tray 11 and the first feed roller 2).

The reason why the sheet laminator 50 changes the second set time T2 is that the length of the two-ply sheet PJ in the sheet conveyance direction varies. More specifically, as the sheet size (i.e., the size of the sheet in the sheet conveyance direction) increases, the "first set time T1" at no multiple feed and the "second set time T2" at multiple feed are set longer. However, when the two-ply sheets PJ having the same sheet size (i.e., the same size of the sheet in the sheet conveyance direction) have different kinds (e.g., different brands) or different thickness, the two-ply sheet PJ and another two-ply sheet PJ (for example, a subsequent two-ply sheet PJ) may have different slip amounts from each other when the multiple feed occurs. As a result, the multifed two-ply sheets PJ have different lengths from each other.

To be more specific, the second set time T2 (or the second predetermined amount NB) of the two-ply sheet PJ having the kind of a relatively large surface friction coefficient and being easily slip due to a large surface friction coefficient is set to be longer than the second set time T2 (of the second predetermined amount NB) of the two-ply sheet PJ having the kind of a relatively small surface friction coefficient. Referring to FIG. 16, a relatively thick two-ply sheet PJ is more likely to slip when compared with a relatively thin two-ply sheet PJ. For this reason, the second set time T2 (of the second predetermined amount NB) of the relatively thick two-ply sheet PJ is set longer than the second set time T2 (of the second predetermined amount NB) of the relatively thin two-ply sheet PJ.

The information of thickness and kind of the two-ply sheet PJ is obtained based on the information input by, e.g., a user to the operation display panel 49 (see FIG. 1).

To be more specific, the controller 90 controls detection of multiple feed and paper jam of the two-ply sheet PJ along the flow of the control process illustrated in FIG. 15. The control flow illustrated in FIG. 15 is different from the control flow illustrated in FIG. 14 in that step S45 is added before step S40. In other words, when the multiple feed detection sensor 61 has detected the multiple feed (NO in step S36), the controller 90 checks the data of the second set time T2 (or the second predetermined time NB) stored in advance in the memory of the controller 90 with the information regarding the kind and thickness of the two-ply sheet PJ, so that the optimal second set time T2 (or the optimal second predetermined amount NB) is obtained (calculated) (step S45). Then, the controller 90 determines whether the elapsed time from step S32 (or the length in the sheet conveyance direction) has reached the second set time T2 (or the second predetermined amount NB (step S40).

If the controller 90 controls as described above, the multifed two-ply sheet PJ can easily be removed from the sheet laminator 50.

Modification 2

A description is given of an image forming system according to Modification 2, with reference to FIG. 17.

FIG. 17 is a diagram illustrating an image forming system 200 according to Modification 2 of an embodiment of the present disclosure.

As illustrated in FIG. 17, the image forming system 200 according to Modification 4 includes an image forming apparatus 100 provided with an image forming device 101 that performs an image forming operation to form an image on a sheet P such as the inner sheet PM. The sheet laminator 50 (the sheet separation device 1) illustrated in FIG. 1 is attached to the image forming apparatus 100. However, in the image forming system 200, the sheet P that is fed from a sheet feeding device 112 disposed in the image forming apparatus 100 and conveyed by a sheet feed roller 197 disposed in the image forming apparatus 100 is conveyed as the inner sheet PM to the sheet laminator 50.

With reference to FIG. 17, the image forming apparatus 100 further includes a document feeder 110 and a document reading device 102. The document feeder 110 includes multiple pairs of sheet conveyance rollers to feed an original document D from a document loading table and convey the original document D in a direction indicated by arrow in FIG. 20. By so doing, the original document D passes over the document reading device 102. At this time, the document reading device 102 optically reads image data of the original document D while the original document D is passing over the document reading device 102.

The image data optically scanned by the document reading device 102 is converted into electrical signals. The electrical signals are then transmitted to a writing device 103 included in the image forming device 101. The writing device 103 emits laser beams onto photoconductor drums 105Y, 105M, 105C, and 105K, based on the electrical signals of the image data in each of colors, respectively, in the exposing process.

In the image forming apparatus 100, a charging process, the exposing process, and a developing process are sequentially executed on the photoconductor drums 105Y, 105M, 105C, and 105K of respective image forming units 104Y, 104M, 104C, and 104K to form desired images on the photoconductor drums 105Y, 105M, 105C, and 105K, respectively.

The images formed on the photoconductor drums 105Y, 105M, 105C, and 105K are then transferred and superimposed onto an intermediate transfer belt 178 to form a color image. The color image formed on the intermediate transfer belt 178 is further transferred onto the surface of a sheet P (which is to be the inner sheet PM) fed and conveyed from the sheet feeding device 112 by the sheet feed roller 197 at a position at which the intermediate transfer belt 178 faces a secondary transfer roller 189.

After the color image is transferred onto the surface of the sheet P (i.e., the surface of the inner sheet PM), the sheet P is conveyed to the position of a fixing device 120. The fixing device 120 fixes the transferred color image on the surface of the sheet P, to the sheet P by performing the fixing operation in the fixing process. The fixing device 120 includes a fixing roller 121 and a pressure roller 122. The fixing roller 121 includes a fixing heater 123 serving as a heater. The pressure roller 122 contacts the fixing roller 121 with pressure to form a fixing nip region to which the sheet P is conveyed.

The sheet P is then ejected from the image forming apparatus 100 by an ejection roller pair 131 and is fed as the inner sheet PM into the sheet laminator 50 via a relay device 150. At this time, when the sheet laminator 50 receives the inner sheet PM, the sheet laminator 50 has completed the operation described with reference to FIGS. 5A to 8C, in other words, the sheet separating operation to separate the two-ply sheet PJ, and performs the operation described with reference to FIGS. 9A to 9C, in other words, the sheet inserting operation to insert the inner sheet PM into the two-ply sheet PJ, after the sheet laminator 50 receives the inner sheet PM. Further, after the sheet lamination unit 51 has completed the sheet laminating operation on the two-ply sheet PJ in which the inner sheet PM is inserted, the first ejection roller pair 7 ejects the two-ply sheet PJ to stack the two-ply sheet PJ on the ejection tray 13.

As described above, a series of image forming processes (i.e., the printing operations) in the image forming apparatus 100 and a series of sheet separating operation and the sheet laminating operation of the inner sheet PM on which the image in the sheet laminator 50 is formed are completed.

When the above-described sheet laminating operation is not performed, the image forming apparatus 100 according to Modification 2 ejects the sheet P having the image formed in the image forming operations, from a second ejection roller pair 132 to the outside of the image forming apparatus 100, so as to stack the sheet P on the top face of the relay device 150 (serving as an ejection tray).

In the image forming system 200 having the above-described configuration, when the two-ply sheet PJ is multifed with another two-ply sheet PJ (or a subsequent two-ply sheet PJ), the criteria for determining detection of paper jam (e.g., the set time T) is changed from the time when the two-ply sheet PJ is not multifed. Accordingly, this configuration of the image forming apparatus 100 according to Modification 2 can prevent the failure in which the controller 90 detects that the paper jam has occurred in the sheet conveyance passage (i.e., the conveyance of the two-ply sheet PJ is stopped) without ejecting the multifed two-ply sheet PJ to the purge tray 55 even when the multifed two-ply sheet PJ can be conveyed and causes the sheet laminator 50 to stop the operation. Due to such a configuration, the operability of the sheet laminator 50 in removal of the multifed two-ply sheet PJ from the sheet laminator 50 is enhanced.

The image forming apparatus 100 according to Modification 2 of the present disclosure is a color image forming apparatus but may be a monochrome image forming apparatus. The image forming apparatus 100 according to Modification 2 of the present disclosure employs electrophotography, but the present disclosure is not limited to an electrophotographic image forming apparatus. For example, the present disclosure may be applied to other types of image forming apparatuses such as an inkjet image forming apparatus and a stencil printing machine.

Modification 3

Figure 18A:
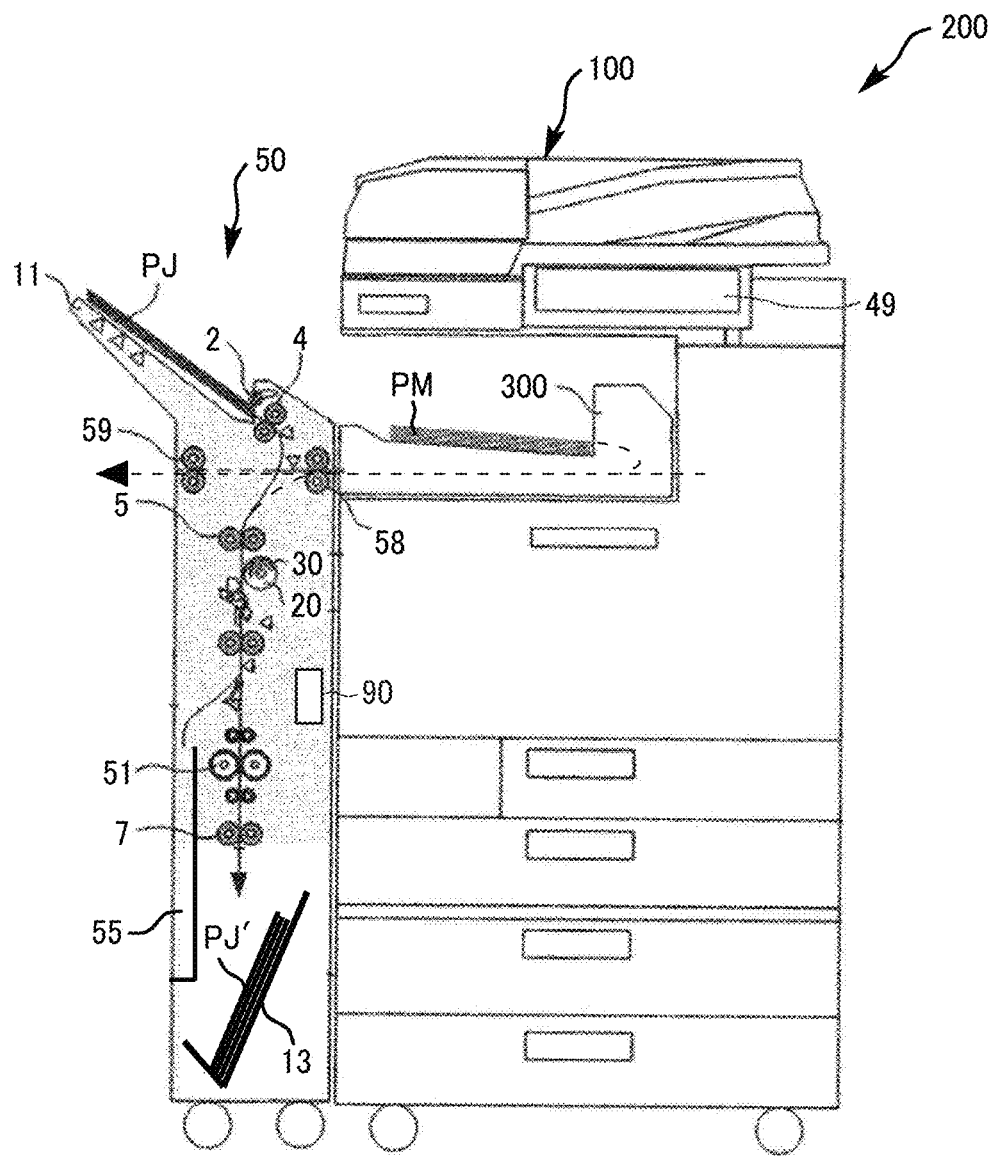
FIGS. 18A and 18B are diagrams, each illustrating an image forming system according to Modification 3 of an embodiment of the present disclosure.
Figure 18B:
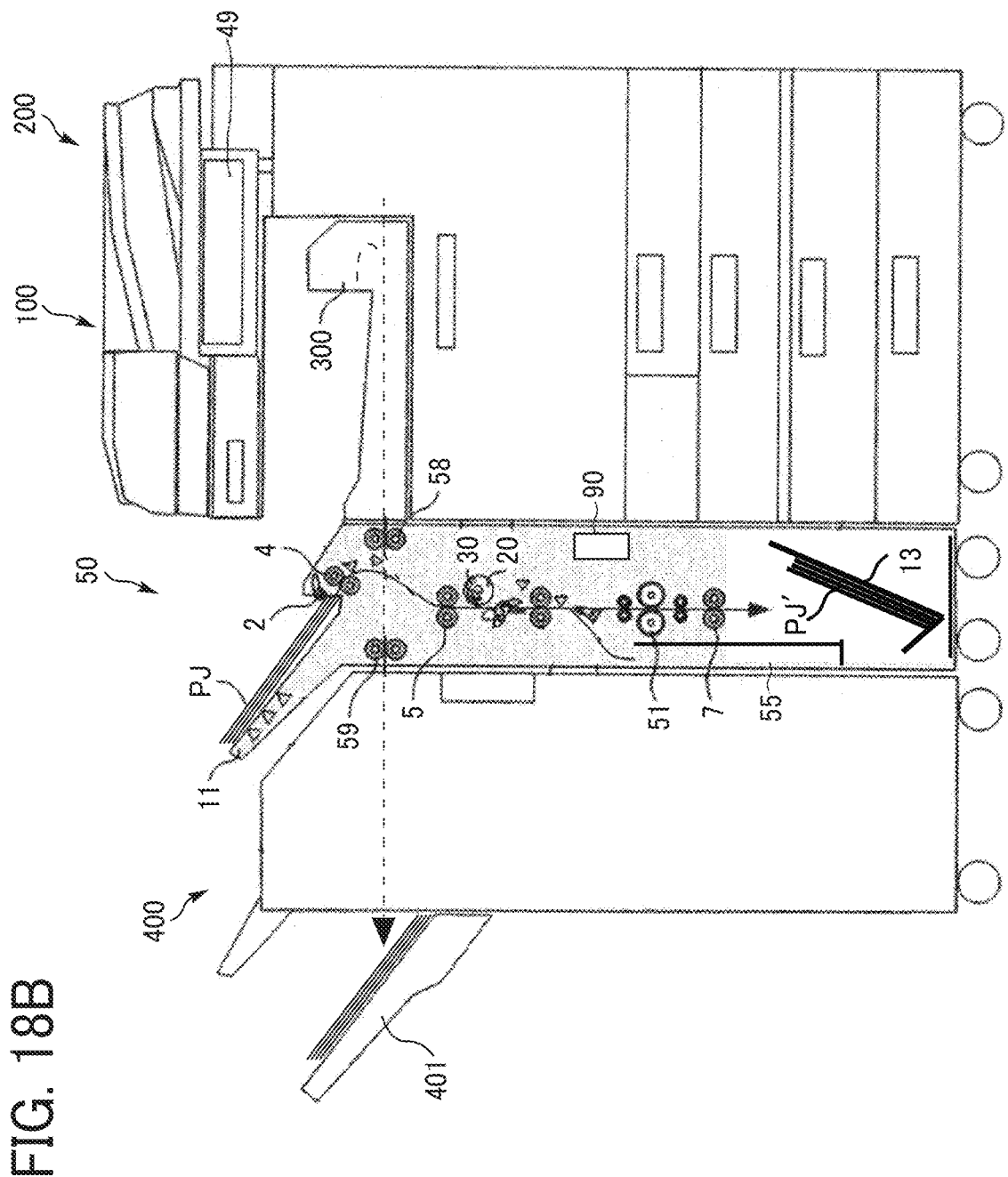

A description is given of an image forming system according to Modification 3, with reference to FIGS. 18A and 18B.

FIGS. 18A and 18B are diagrams, each illustrating an image forming system according to Modification 3 of an embodiment of the present disclosure.

As illustrated in FIGS. 18A and 18B, the image forming system 200 according to Modification 3 includes the image forming apparatus 100 and the sheet laminator 50 provided with the sheet separation device 1 and the sheet lamination device 51. The sheet laminator 50 (serving as a sheet processing apparatus) is detachably attached to the image forming apparatus 100. As in the image forming apparatus 100 according to Modification 2, the sheet P that is fed from the sheet feeding device 112 and conveyed by the sheet feed roller 197 in the image forming apparatus 100 is conveyed as the inner sheet PM to the sheet laminator 50 attached to the image forming apparatus 100 of Modification 3.

In the image forming system 200 illustrated in FIG. 18A, the image forming apparatus 100 performs the image forming operations on the sheet P, as described above with reference to FIG. 17. Then, the ejection roller pair 131 of the image forming apparatus 100 ejects the sheet P (i.e., the inner sheet PM on which a desired image is formed) from the image forming apparatus 100 to the sheet laminator 50 via the relay device 300. Then, after the sheet P is conveyed to the sheet laminator 50, the sheet P is inserted into the two-ply sheet PJ, where the sheet laminator 50 performs the sheet laminating operation on the two-ply sheet PJ. Then, the first ejection roller pair 7 ejects the two-ply sheet PJ to the ejection tray 13.

In the image forming system 200 having the above-described configuration, when the two-ply sheet PJ is multifed with another two-ply sheet PJ (or a subsequent two-ply sheet PJ), the criteria for determining detection of paper jam (e.g., the set time T) is changed from the time when the two-ply sheet PJ is not multifed. Accordingly, this configuration of the image forming system 200 can prevent the failure in which the controller 90 detects that the paper jam has occurred in the sheet conveyance passage (i.e., the conveyance of the two-ply sheet PJ is stopped) without ejecting the multifed two-ply sheet PJ to the purge tray 55 even when the multifed two-ply sheet PJ can be conveyed and causes the image forming system 200 (the sheet laminator 50) to stop the operation. Due to such a configuration, the operability of the image forming system 200 (the sheet laminator 50) in removal of the multifed two-ply sheet PJ from the image forming system 200 (the sheet laminator 50) can be enhanced.

As described above, the sheet laminator 50 is detachably attached to the image forming apparatus 100. When the sheet laminator 50 is not used, the sheet laminator 50 may be detached from the image forming apparatus 100. When the sheet laminator 50 is detached from the image forming apparatus 100, an ejection tray is provided at the portion to which the sheet laminator 50 is connected. By so doing, when the sheet P having the desired image is ejected by the ejection roller pair 131 to the outside of the image forming apparatus 100, the sheet P is stacked on the ejection tray.

In addition to the sheet conveyance passage for guiding the inner sheet PM ejected from the image forming apparatus 100 to the sheet separation device 1 (the winding roller 20), the sheet laminator 50 may be provided with another sheet conveyance passage (defined by sheet conveying roller pairs 58 and 59), as illustrated in FIG. 18A, for ejecting the sheet P ejected from the image forming apparatus 100 without performing the sheet laminating operation on the sheet P.

The image forming system 200 may also be provided with a relay device 300 that guides the sheet P (including the inner sheet PM) ejected from the image forming apparatus 100 to the sheet laminator 50. In this case, the inner sheet PM may be fed from the relay device 300.

Further, FIG. 18B is a schematic view of the image forming system 200 according to yet another embodiment of the present disclosure. As the image forming system 200 illustrated in FIG. 18B, a post-processing apparatus 400 may be provided to perform the post-processing operations including the punching operation and the stapling operation, on the sheet P ejected from the image forming apparatus 100 through the sheet laminator 50 (in other words, on the sheet P without the sheet laminating operation). In such a case, the sheet P is ejected to an ejection tray 401 of the post-processing apparatus 400 after the post-processing operation has been performed on the sheet P.

As described above, the sheet laminator 50 serving as a sheet processing apparatus according to the present embodiment includes: the sheet feeder (i.e., the first sheet tray 11 and the first feed roller 2) that feeds the two-ply sheet PJ (sheet) toward the sheet conveyance passage; a sheet processing device (i.e., the sheet separation device 1 and the sheet lamination device 51) that performs the predetermined process on the two-ply sheet PJ conveyed in the sheet conveyance passage; the ejection unit (i.e., the ejection tray 13) to which the two-ply sheet PJ is ejected after the predetermined operation in the sheet processing device; and a purge unit (i.e., the purge tray 55) to which the two-ply sheet PJ is ejected and stacked when the predetermined operation is not performed on the two-ply sheet PJ in the sheet processing device. The sheet laminator 50 further includes the multifeed detection sensor 61 (serving as a multifeed detector or sensor) disposed in the sheet conveyance passage to detect whether the two-ply sheets PJ fed from the first sheet tray 11 and the first feed roller 2 are multifed. FIG. 1, the sheet laminator 50 further includes the sheet detectors (sheet sensors), which are the third sensor 43, the fourth sensor 44, the fifth sensor 45, the seventh sensor 47, and the eighth sensor 48. The sheet detectors are disposed downstream from the multifeed detection sensor 61 along the sheet conveyance passage in the sheet conveyance direction to detect the two-ply sheet PJ passing the position of the sheet detectors (sheet sensors). When the detection sensor 61 has not detected multifeed of the two-ply sheets PJ and if the sheet detector or sensor does not detect the trailing end of the two-ply sheet PJ after the first set time T1 has elapsed from the time at which the sheet detector (sheet sensor) detects the leading end of the two-ply sheet PJ, the controller 90 causes the sheet laminator 50 to stop the operation. As described above, the first set time T1 is a predetermined time or a time determined in advance in accordance with the size of the two-ply sheet PJ in the sheet conveyance direction.

On the other hand, when the multifeed detection sensor 61 has detected multifeed of the two-ply sheets PJ and: (1) if the sheet detector or sensor does not detect the trailing end of the two-ply sheet PJ after the second set time T2 that is set longer than the first set time T1 has elapsed from the time at which the sheet detector (sheet sensor) detects the leading end of the two-ply sheet PJ, the controller 90 causes the sheet laminator 50 to stop the operation; and (2) if the sheet detector or sensor detects the trailing end of the two-ply sheet PJ before the second set time T2 has elapsed from the time at which the sheet detector (sheet sensor) detects the leading end of the two-ply sheet PJ, the controller 90 causes the sheet laminator 50 to convey the two-ply sheet PJ toward the purge tray 55 without stopping the operation of the sheet laminator 50.

As a result, the multifed two-ply sheet PJ can be easily removed from the sheet laminator 50.

In the present embodiment, the present disclosure is applied to the sheet laminator 50 as a sheet processing apparatus. On the other hand, the present disclosure may be applied to a sheet separation device serving as a sheet processing apparatus. The sheet separation device is, for example, a device included in the sheet laminator 50 in FIG. 1, without the sheet lamination device 51). Further, the present disclosure may be applied to a sheet processing device that executes the process on the sheet where the process is different from the sheet separating operation, the sheet inserting operation, and the sheet laminating operation.

Even in such cases, an advantageous effect substantially equivalent to the present embodiment can be obtained. However, the two-ply sheet PJ is made of, for example, a film material and is likely to be fed with another two-ply sheet PJ such as a subsequent two-ply sheet PJ due to electrostatic attraction (multiple feed). For these reasons, it is useful to apply the present disclosure to a sheet processing apparatus according to an embodiment.

Note that embodiments of the present disclosure are not limited to the above-described embodiments and it is apparent that the above-described embodiments can be appropriately modified within the scope of the technical idea of the present disclosure in addition to what is suggested in the above-described embodiments. Further, features of components of the embodiments, such as the number, the position, and the shape are not limited the embodiments and thus may be preferably set.

Note that, in the present disclosure, the "end face" of the two-ply sheet is defined as an end (side face) of the two-ply sheet extending in the thickness direction and connecting the front face and the back face of the two-ply sheet. Accordingly, there are four end faces of the rectangular two-ply sheet on the front, back, left, and right.

The present disclosure may be applicable to, for example, a combination of the following Aspects 1 to 11.

Aspect 1

A sheet processing apparatus includes a sheet feeder to feed a sheet toward a sheet conveyance passage, a sheet processing device disposed downstream from the sheet feeder in a sheet conveyance direction in which the sheet is conveyed and to perform a predetermined operation on the sheet conveyed in the sheet conveyance passage, a sheet ejection device disposed downstream from the sheet processing device in the sheet conveyance direction and to stack the sheet when the predetermined operation has been performed on the sheet by the sheet processing device, a purge unit disposed downstream from the sheet processing device in the sheet conveyance direction and to stack the sheet when the predetermined operation has not been performed on the sheet by the sheet processing device, a multifeed sensor disposed on the sheet conveyance passage and to detect whether the sheet and another sheet are multifed from the sheet feeder, a sheet sensor disposed downstream from the multifeed sensor on the sheet conveyance passage in the sheet conveyance direction and to detect the sheet passing a position of the sheet sensor, and circuitry. The circuitry stops an operation of the sheet processing apparatus when the multifeed sensor has not detected multifeed of the sheet and the sheet sensor does not detect a trailing end of the sheet after a first set time set in advance in accordance with a size of the sheet in the sheet conveyance direction has elapsed from detection of a leading end of the sheet with the sheet sensor; stops an operation of the sheet processing apparatus when the multifeed sensor has detected the multifeed of the sheet and the sheet sensor does not detect the trailing end of the sheet after a second set time longer than the first set time has elapsed from the detection of the leading end of the sheet with the sheet sensor; and causes the sheet processing apparatus to convey the sheet toward the purge unit without stopping the operation of the sheet processing apparatus when the multifeed sensor has detected the multifeed of the sheet and the sheet sensor detects the trailing end of the sheet before the second set time elapses from the detection of the leading end of the sheet with the sheet sensor.

Aspect 2

In the sheet processing apparatus according to Aspect 1, the multifeed sensor is disposed in proximity to the sheet feeder.

Aspect 3

In the sheet processing apparatus according to Aspect 1, the multifeed sensor is an optical sensor to detect the sheet passing a position of the multifeed sensor.

Aspect 4

In the sheet processing apparatus according to Aspect 1, the circuitry causes the multifeed sensor to detect a leading end of the sheet passing a position of the multifeed sensor, and determine that the sheet is multifed with said another sheet when the multifeed sensor does not detect a trailing end of the sheet after a predetermined time in accordance with the size of the sheet in the sheet conveyance direction has elapsed from detection of the leading end of the sheet with the multifeed sensor.

Aspect 5

In the sheet processing apparatus according to Aspect 1, the circuitry changes the second set time based on at least one of a thickness of the sheet fed from the sheet feeder or a kind of the sheet fed from the sheet feeder.

Aspect 6

In the sheet processing apparatus according to Aspect 1, the circuitry adjusts the second set time based on an input by an operator.

Aspect 7

The sheet processing apparatus according to Aspect 1 further includes another sheet sensor disposed in proximity to the sheet feeder and configured to detect the sheet passing a position of said another sheet sensor, and the circuitry sets the second set time based on a time from when said another sheet sensor detects the leading end of the sheet to when said another sheet sensor detects the trailing end of the sheet.

Aspect 8

In the sheet processing apparatus according to any one of Aspects 1 to 7, the sheet processing device includes a sheet separation device to perform a sheet separating operation to separate a non-bonding portion of a two-ply sheet in which two sheets are overlapped and bonded together at a bonding portion of the two-ply sheet, and a sheet inserting operation to insert an inner sheet between the two sheets of the two-ply sheet separated in the sheet separating operation. The sheet feeder feeds the two-ply sheet toward the sheet conveyance passage. The multifeed sensor detects whether the two-ply sheet fed by the sheet feeder is multifed with another two-ply sheet.

Aspect 9

In the sheet processing apparatus according to Aspect 8, the sheet processing device includes a sheet lamination device to perform a sheet laminating operation on the two-ply sheet with the inner sheet inserted between the two sheets separated by the sheet separation device.

Aspect 10

An image forming system includes the sheet processing apparatus according to any one of Aspects 1 to 7, and an image forming apparatus to form an image on a sheet.

Aspect 11

In the image forming system according to Aspect 10, the sheet processing apparatus is detachably attached to the image forming apparatus.

The present disclosure is not limited to specific embodiments described above, and numerous additional modifications and variations are possible in light of the teachings within the technical scope of the appended claims. It is therefore to be understood that, the disclosure of this patent specification may be practiced otherwise by those skilled in the art than as specifically described herein, and such, modifications, alternatives are within the technical scope of the appended claims. Such embodiments and variations thereof are included in the scope and gist of the embodiments of the present disclosure and are included in the embodiments described in claims and the equivalent scope thereof.

The effects described in the embodiments of this disclosure are listed as the examples of preferable effects derived from this disclosure, and therefore are not intended to limit to the embodiments of this disclosure.

The embodiments described above are presented as an example to implement this disclosure. The embodiments described above are not intended to limit the scope of the invention. These novel embodiments can be implemented in various other forms, and various omissions, replacements, or changes can be made without departing from the gist of the invention. These embodiments and their variations are included in the scope and gist of this disclosure and are included in the scope of the invention recited in the claims and its equivalent.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. A sheet processing apparatus comprising:
a sheet feeder configured to feed a sheet toward a sheet conveyance passage;
a sheet processing device disposed downstream from the sheet feeder in a sheet conveyance direction in which the sheet is conveyed, the sheet processing device configured to perform a predetermined operation on the sheet conveyed in the sheet conveyance passage;
a sheet ejection device disposed downstream from the sheet processing device in the sheet conveyance direction, the sheet ejection device configured to stack the sheet when the predetermined operation has been performed on the sheet by the sheet processing device;
a purge unit disposed downstream from the sheet processing device in the sheet conveyance direction, the purge unit configured to stack the sheet when the predetermined operation has not been performed on the sheet by the sheet processing device;
a multifeed sensor disposed on the sheet conveyance passage and configured to detect whether the sheet and another sheet are multifed from the sheet feeder;
a sheet sensor disposed downstream from the multifeed sensor on the sheet conveyance passage in the sheet conveyance direction and configured to detect the sheet passing a position of the sheet sensor; and
circuitry configured to:
stop an operation of the sheet processing apparatus when the multifeed sensor has not detected multifeed of the sheet and the sheet sensor does not detect a trailing end of the sheet after a first set time set in advance in accordance with a size of the sheet in the sheet conveyance direction has elapsed from detection of a leading end of the sheet with the sheet sensor;
stop an operation of the sheet processing apparatus when the multifeed sensor has detected the multifeed of the sheet and the sheet sensor does not detect the trailing end of the sheet after a second set time longer than the first set time has elapsed from the detection of the leading end of the sheet with the sheet sensor; and
cause the sheet processing apparatus to convey the sheet toward the purge unit without stopping the operation of the sheet processing apparatus when the multifeed sensor has detected the multifeed of the sheet and the sheet sensor detects the trailing end of the sheet before the second set time elapses from the detection of the leading end of the sheet with the sheet sensor.

2. The sheet processing apparatus according to claim 1, wherein the multifeed sensor is disposed in proximity to the sheet feeder.

3. The sheet processing apparatus according to claim 1, wherein the multifeed sensor is an optical sensor to detect the sheet passing a position of the multifeed sensor.

4. The sheet processing apparatus according to claim 1, wherein the circuitry is configured to:
cause the multifeed sensor to detect a leading end of the sheet passing a position of the multifeed sensor; and
determine that the sheet is multifed with said another sheet when the multifeed sensor does not detect a trailing end of the sheet after a predetermined time in accordance with the size of the sheet in the sheet conveyance direction has elapsed from detection of the leading end of the sheet with the multifeed sensor.

5. The sheet processing apparatus according to claim 1, wherein the circuitry is configured to change the second set time based on at least one of a thickness of the sheet fed from the sheet feeder or a kind of the sheet fed from the sheet feeder.

6. The sheet processing apparatus according to claim 1, wherein the circuitry is configured to adjust the second set time based on an input by an operator.

7. The sheet processing apparatus according to claim 1, further comprising another sheet sensor disposed in proximity to the sheet feeder and configured to detect the sheet passing a position of said another sheet sensor,
wherein the circuitry is configured to set the second set time based on a time from when said another sheet sensor detects the leading end of the sheet to when said another sheet sensor detects the trailing end of the sheet.

8. The sheet processing apparatus according to claim 1, wherein the sheet processing device includes a sheet separation device configured to:
- perform a sheet separating operation to separate a non-bonding portion of a two-ply sheet in which two sheets are overlapped and bonded together at a bonding portion of the two-ply sheet; and
- perform a sheet inserting operation to insert an inner sheet between the two sheets of the two-ply sheet separated in the sheet separating operation,
    - wherein the sheet feeder is configured to feed the two-ply sheet toward the sheet conveyance passage, and
    - wherein the multifeed sensor is configured to detect whether the two-ply sheet fed by the sheet feeder is multifed with another two-ply sheet.

9. The sheet processing apparatus according to claim 8, wherein the sheet processing device includes a sheet lamination device configured to perform a sheet laminating operation on the two-ply sheet with the inner sheet inserted between the two sheets separated by the sheet separation device.

10. An image forming system comprising:
- the sheet processing apparatus according to claim 1; and
- an image forming apparatus to form an image on the sheet.

11. The image forming system according to claim 10, wherein the sheet processing apparatus is detachably attached to the image forming apparatus.

* * * * *